(12) United States Patent
D'Agostino

(10) Patent No.: US 9,217,251 B2
(45) Date of Patent: *Dec. 22, 2015

(54) ARTICLES AND METHODS FOR LAYING CERAMIC TILE FLOOR

(71) Applicant: Joseph D. D'Agostino, Grand Island, NY (US)

(72) Inventor: Joseph D. D'Agostino, Grand Island, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/664,612

(22) Filed: Mar. 20, 2015

(65) Prior Publication Data

US 2015/0191916 A1  Jul. 9, 2015

Related U.S. Application Data

(63) Continuation-in-part of application No. 13/466,649, filed on May 8, 2012, now Pat. No. 9,003,741, which is a continuation-in-part of application No. 13/004,329, filed on Jan. 11, 2011, now Pat. No. 8,590,269, which is a continuation-in-part of application No. 12/815,633, filed on Jun. 15, 2010, now Pat. No. 8,613,182.

(60) Provisional application No. 61/485,871, filed on May 13, 2011.

(51) Int. Cl.
| | |
|---|---|
| E04B 1/00 | (2006.01) |
| E04F 15/02 | (2006.01) |
| E04F 15/08 | (2006.01) |
| B32B 7/12 | (2006.01) |
| B32B 9/00 | (2006.01) |
| B32B 9/04 | (2006.01) |
| B32B 15/20 | (2006.01) |
| B32B 3/14 | (2006.01) |
| E04F 15/16 | (2006.01) |

(52) U.S. Cl.
CPC ........... *E04F 15/0215* (2013.01); *B32B 3/14* (2013.01); *B32B 7/12* (2013.01); *B32B 9/005* (2013.01); *B32B 9/041* (2013.01); *B32B 15/20* (2013.01); *E04F 15/08* (2013.01); *E04F 15/082* (2013.01); *E04F 15/16* (2013.01); *B32B 2419/04* (2013.01); *E04F 2290/00* (2013.01); *Y10T 156/10* (2015.01)

(58) Field of Classification Search
CPC ..... E04F 15/0215; E04F 15/16; E04F 15/082; E04F 15/08; E04F 2290/00; B32B 3/14; B32B 15/20; B32B 9/041; B32B 9/005; B32B 7/12; B32B 2419/04; Y10T 156/10
USPC ........ 52/309.3, 177, 384, 385, 703.1; 156/63, 156/81, 297, 299
See application file for complete search history.

(56) References Cited

U.S. PATENT DOCUMENTS

| | | | | |
|---|---|---|---|---|
| 2,672,793 A | * | 3/1954 | Rowe et al. | 404/31 |
| 5,116,439 A | * | 5/1992 | Raus | 156/71 |

(Continued)

*Primary Examiner* — Patrick Maestri
(74) *Attorney, Agent, or Firm* — James C. Simmons

(57) ABSTRACT

Ceramic floors and methods of making thereof such that the ceramic tiles are quickly and easily removable from the floor substrate and replaceable at a future date, and the ceramic flooring has crack isolation.

A ceramic tile floor is laid by releasably adhering a sheet to a floor substrate using a releasable and not repositionable adhesive and bonding at least one ceramic tile to the sheet with a mortar.

The sheet has a non-porous layer which is adhered to the substrate, a paper layer, and a water barrier layer to prevent swelling of the paper layer by water from the mortar and to thereby prevent lippage. The sheet may have an other paper layer to which the mortar is bonded.

16 Claims, 9 Drawing Sheets

(56) References Cited

U.S. PATENT DOCUMENTS

| | | | |
|---|---|---|---|
| 5,255,482 A * | 10/1993 | Whitacre | 52/390 |
| 5,518,799 A * | 5/1996 | Finestone et al. | 428/137 |
| 6,630,041 B1 * | 10/2003 | Reiber | 156/71 |
| 2002/0050107 A1 * | 5/2002 | Backowski | 52/287.1 |
| 2006/0156663 A1 * | 7/2006 | Mao | 52/403.1 |
| 2007/0151184 A1 * | 7/2007 | Wise et al. | 52/385 |

* cited by examiner

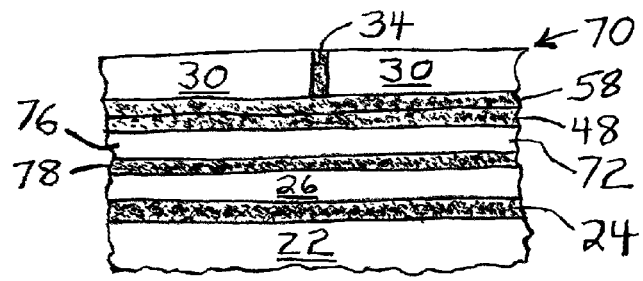
FIG. 8
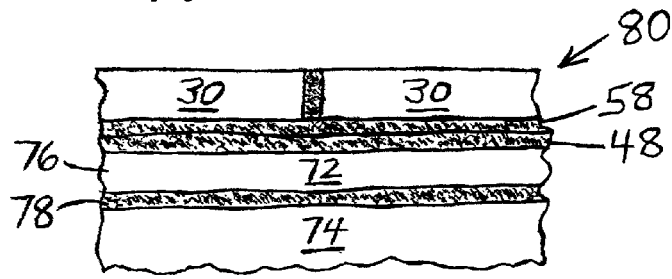
FIG. 9
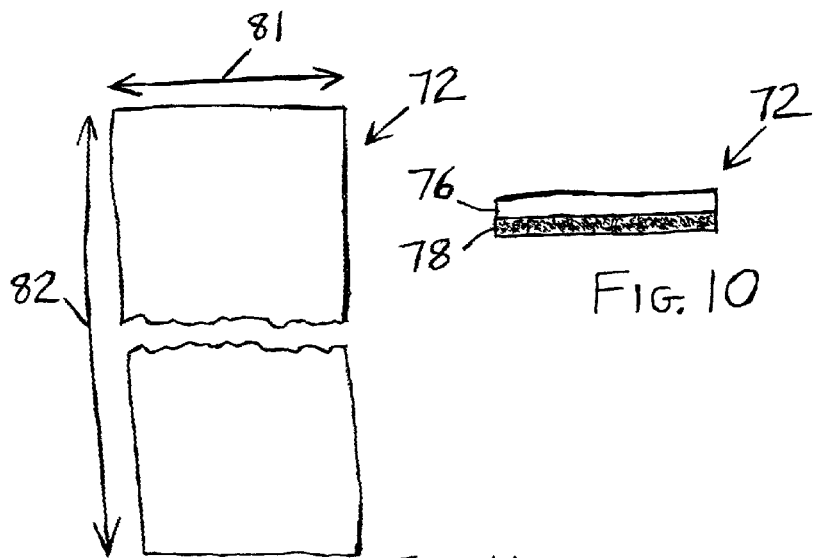
FIG. 10
FIG. 11

ARTICLES AND METHODS FOR LAYING CERAMIC TILE FLOOR

This is a continuation-in-part of application Ser. No. 13/466,649, filed May 8, 2012, which is a continuation-in-part of application Ser. No. 13/004,329, filed Jan. 11, 2011, which is a continuation-in-part of application Ser. No. 12/815,633, filed Jun. 15, 2010, and the priority of provisional application 61/485,871, filed May 13, 2011, is hereby claimed, and all of these applications are hereby incorporated herein by reference.

The present invention is related generally to flooring. More particularly, the present invention is related to ceramic tile flooring.

In order to have sufficient strength to accept ceramic tile, an underlying floor may need to be built-up. For example, it may be necessary to add backer board or a second layer of plywood to a plywood floor. A backer board is a strong dense board (typically 3×5 or 4×4 or 4×5 feet and typically ¼ to ½ inch thick) typically laid on and bonded with conventional latex-modified thinset mortar and attached by screws, nails, or other fasteners to a wood floor to add strength thereto and to support tile so that it doesn't crack. By "latex-modified" is meant the addition of latex or other suitable polymers, in a manner in accordance with principles commonly known to those of ordinary skill in the art to which the present invention pertains, to the thinset mortar to increase its bonding strength. Backer board may be composed of cement, dense wood, gypsum material faced with fiberglass, or other suitable material providing the necessary strength and rigidity. A concrete floor is considered to normally have sufficient strength and rigidity that it does not normally require backer board to be applied thereto. When applied to a floor or floor substrate, unless otherwise specified, a backer board is considered herein to be part of the floor or floor substrate.

A tile is a thin (for example, ⅛ to ½ inch thick) usually rectangular or square (for example, 1-foot square) typically decorative member used to cover floors, the tiles abutting each other across the surface of the covered or tiled floor. Two common types of tile commonly used for flooring may be classified as vinyl and ceramic. As used herein and in the claims, the term "ceramic tile" is intended to include tile made of fired clay, brick, concrete, porcelain, marble, travertine, and other stone or slate, and does not include vinyl tile.

Vinyl tiles are sufficiently flexible and have enough "give" that they do not need the extra strength and rigidity afforded by backer boards and therefore can be laid directly on a wood floor.

In a typical laying of a floor, ceramic tiles have been permanently bonded to the concrete, wood, or backer board substrate, and such a tiled floor is considered satisfactory for use. When it is desired to replace the tiles either to selectively replace certain tiles or for re-decorating purposes or otherwise, difficulties are experienced. Removal of tiles off concrete is considered to be difficult (may need a jack hammer or the like), and removal off backer board or wood may damage the backer board or the wood floor.

The attachment of backer board to a hardwood floor for strengthening thereof so that it may accept ceramic tiles may damage the hardwood floor.

Solutions have been proposed for easily removing floor coverings attached to a floor. For example, for carpet, U.S. Pat. No. 5,116,439 discloses a two-component release web secured between a carpet (or other floor covering) and a floor. The web is formed as a laminate of a solid flexible carded fiber membrane to which a solid flexible non-woven spun-bonded fiber membrane is adhered, one membrane being adhered to the carpet during manufacture and the other membrane being glued to the floor during installation. It is further stated that the carpet may be peeled from the floor leaving one membrane secured to the carpet and the other membrane secured to the floor, thus permitting reuse of the carpet in another location and permitting ready installation of a new carpet over the membrane secured to the floor.

This U.S. Pat. No. 5,116,439 also discusses an adhesive carpet installation system which uses a carpet cushion with a "fuzzy" fibrous material bonded to one surface of the cushion. The cushion is glued to the floor surface with the "fuzzy" surface down through use of a pressure sensitive adhesive. The carpet itself is then glued to the upper surface of the cushion using the same pressure sensitive adhesive used to secure the cushion to the floor. It is said that this renders the carpet system totally releasable.

Other U.S. patents/published applications which may be of interest to the present application include Re. 34,357; U.S. Pat. Nos. 3,364,058; 3,765,972; 4,698,249; 5,188,874; 5,501,895; 5,578,363; 6,413,335; 6,630,041; 6,698,149; 6,854,241; 7,183,338; 7,194,843; 7,488,523; 7,520,948; 7,536,835; 7,543,417; 2005/0183370; 2005/0223664; 2007/0151184; and 2009/0218030. All of these U.S. patents/published applications and any others disclosed herein are hereby incorporated herein by reference.

Published patent application 2007/0151184 discloses an easy to install and remove tile system for tiles, particularly resilient tiles, such as vinyl, wherein the tiles are adhered to a high modulus high tear strength liner, such as a rigid vinyl film, which is caused to float on (not attached) or is adhered to the substrate. The adhesive adhering the tile to the liner may be adhesive dots applied to each corner of the tile, pressure-sensitive adhesive, or a spray adhesive. Other examples of what might be called a "loose-lay" process are disclosed in the aforesaid U.S. patents/published application Re. 34,357; U.S. Pat. Nos. 5,188,874; 5,578,363; and 2005/0223664.

Published patent application 2009/0218030 discloses a flooring underlayment membrane bonded to a concrete or wood substrate with thinset mortar (or loose-laid) and tile or stone or slate or other rigid floor covering bonded thereto with thinset mortar. The underlayment membrane comprises two nonwoven fiber mats bonded together with an extrudable thermoplastic resin to provide a combined waterproof membrane and crack isolation membrane.

Congoleum of Mercerville, N.J., markets a 6 feet wide membrane known as an Underfloor membrane which comprises a combination of fibrous felt and pvc (polyvinylchloride) vinyl, and Mannington of Salem, N.J., markets a 6 feet wide membrane known as a mul membrane ("mul" is also a fibrous felt and pvc vinyl combination) wherein the membranes are loosely laid for application of vinyl tiles bonded thereto. Vinyl tiles are sufficiently flexible that they would not normally be expected to experience the difficult cracking and breaking problems that rigid ceramic tiles would experience when laid loosely.

Avaire Floors (having a world wide web address of www.avairefloors.com and whose parent is believed to be called SnapStone) provides a loose lay system which includes porcelain or stone tiles permanently bonded to a plastic grid with a rubberized base. The plastic grids have interlocking tabs which allow them to be clicked together so that they do not move. It is believed that these tiles are grouted with the flexible grout disclosed in the aforesaid U.S. Pat. No. 7,183,338. Such plastic grid tiles are undesirably thicker so there is more transition to overcome when one goes from one room to another. Also, such plastic grid tiles undesirably do not allow the laying of conventional ceramic tiles, i.e., ceramic tiles without such plastic grids attached.

U.S. Pat. No. 7,520,948 discloses a non-woven fabric which may comprise a synthetic polymer and which is adhered to a floor using an adhesive, and a cementitious bondant (i.e., a skimcoat of thinset mortar) is applied to the fabric, either before or after adhering it to the surface of the floor. A covering in the form of ceramic tile, stone, brick, porcelain, marble, slate, etc. is thereafter bound to the bondant. It is stated that the bondant can be any suitable adhesive, mortar, or other composition or any combination of such substances suitable for fixing the covering to the fabric. The adhesive can be a contact cement or self-stick adhesive faced by a removable waxed paper. It is discussed therein that the non-woven fabric can aid removal of the covering (i.e., tile) at a time following its installation. Examples of non-woven fabrics are said to include randomly-entangled fibrous sheets, chemically-bonded fibrous sheets, thermally-bonded fibrous sheets, and others known in the art. The adhesive may be a contact cement, and the non-woven fabric (underlayer) can have an adhesive (e.g., a self-stick adhesive faced by a removable waxed paper) disposed on the face opposite the bondant. The tile is bound to the fabric by way of a thinset mortar or adhesive set atop a cementitious bondant applied to the fabric. U.S. Pat. No. 7,520,948 suggests that the cohesive strength of the fabric is such that it should tear internally to aid removal of the covering (i.e., ceramic tile or the like) at a time following its installation. It is further stated that in situations in which reversibility of fabric installation is desirable, it is preferable that the adhesive bind the fabric to the surface with little more tenacity than required for stable installation of the fabric and covering and that in a situation such as a ceramic tile floor in which significant stresses, wear, and tear are anticipated, the adhesive must bind the fabric to the surface with sufficient tenacity and stability that the fabric will not significantly separate from the surface under the conditions of normal use.

The above U.S. Pat. No. 7,520,948 importantly does not disclose whether the floor to which the non-woven fabric is adhered is a concrete floor, a wood floor on which backer board has been laid, a hardwood floor, or otherwise. Moreover, U.S. Pat. No. 7,520,948 discusses in very broad and general terms non-woven fabrics and adhesives for application to floors generally without any suggestions as to what items or combination of particular items might be suitable for one type of floor (substrate) and what might be suitable for another type of floor (substrate).

A contact cement or self-stick adhesive is commonly understood to be an adhesive or cement which is sticky (tacky) without any heat or solvent for activation and adheres with light pressure. Such an adhesive may be of a type which forms a permanent or non-removable bond so that the bonded item is not readily removable from the substrate. By suggesting that the non-woven fabric should tear internally to aid removal of the covering, the above U.S. Pat. No. 7,520,948 implies that the adhesive is of a type that permanently bonds the fabric to the floor. Such a product would however undesirably damage a hardwood floor to which the fabric is permanently bonded.

I have recently learned that it is common practice for companies that have ceramic tile on exhibit temporarily in convention halls to bond the ceramic tile to Kraftpaper that is laid loose on concrete floors whereby the tile can be easily removed at the end of the period of exhibition. I have also recently learned that some ceramic tile showrooms bond ceramic tiles to vinyl sheets that are bonded to a concrete floor with a minimal amount of releasable adhesive whereby they can be easily changed when it is so desired. To my knowledge, such exhibition and showroom flooring has not been used on any floor substrates other than concrete.

It is accordingly an object of the present invention to prepare a floor so that ceramic tiles may be laid thereon such as to provide a tiled floor which is durable (including having crack isolation) yet so that the tiles are quickly and easily removable and replaceable at a future date.

It is another object of the present invention to provide a pre-fabricated article for use in easily and quickly preparing the floor to lay the ceramic tiles.

It is yet another object of the present invention to provide a prefabricated ceramic tile composite article to ease the laying of the ceramic tile on-site and to prepare a floor so that the prefabricated articles may be laid thereon such that they are quickly and easily removable and replaceable at a future date.

The above and other objects, features, and advantages of the present invention will be apparent in the following detailed description of the preferred embodiments thereof when read in conjunction with the appended drawings in which the same reference numerals depict the same or similar parts throughout the several views.

BRIEF DESCRIPTION OF THE DRAWINGS

FIG. 8 is a view similar to that of FIG. 1A of a portion of flooring in accordance with another embodiment of the present invention, wherein the flooring substrate includes backer board.

FIG. 9 is a view similar to that of FIG. 1A of a portion of flooring in accordance with the another embodiment of the present invention, wherein the flooring substrate is concrete and does not include backer board.

FIG. 10 is a view similar to that of FIG. 1A of a portion of an article for application to flooring in accordance with the present invention.

FIG. 11 is an illustration of a plan view of the article of FIG. 10.

DETAILED DESCRIPTION OF THE PREFERRED EMBODIMENT(S)

Figure 1A:
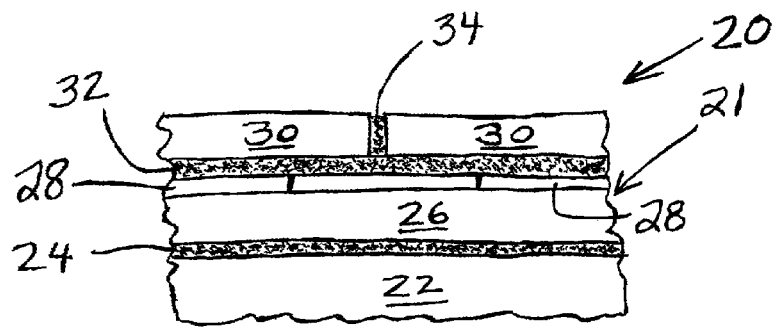
FIG. 1A is an illustration of an edge view of a portion of flooring which embodies the present invention, wherein the flooring substrate is wood and includes backer board.

Referring to FIG. 1A, there is shown generally at 20 a tiled floor which comprises a floor 21 which includes a wood floor substrate 22 to which has been bonded by the use of the aforesaid conventional latex-modified thinset mortar, illustrated at 24, a plurality (one shown) of strengthening backer boards 26. As appropriate, the backer boards 26 may also be otherwise suitably attached such as by screws, nails, or other fasteners. The backer boards 26 may, for example, be DensShield gypsum boards marketed by Georgia-Pacific Gypsum LLC of Atlanta, Ga., having a thickness of, for example, ¼ inch. It should be understood that, alternatively, the floor 21 may be a concrete floor substrate (as discussed hereinafter with respect to FIG. 1B), or it may be a sufficiently rigid hardwood floor or other sufficiently rigid wood substrate which does not include the backer boards. For example, the floor 21 may include a substrate of ⅝ inch douglas fir plywood to the upper surface of which is screwed or otherwise suitably attached ⅝ inch plywood.

In accordance with the present invention, laid on top of the backer boards 26 are suitable sheets in rolls or tiles or paper or other forms such as, for example, vinyl tiles 28, pvc (polyvinylchloride) sheets, vinyl composition rubber sheets, fiberglass sheets, or a sheet which is a combination of fibrous felt and pvc or vinyl tiles, which are unattached to the backer boards 26. Thus, the sheets or vinyl tiles 28 are laid so as to "float" on the floor substrate 26, i.e., they are laid unattached to the floor substrate 26, whereby the thereafter laid ceramic tiles, as hereinafter described, can be easily and quickly removed for replacement by lifting the vinyl tiles 28, with the ceramic tiles attached, from the floor 21. The vinyl tiles 28 may, for example, be ⅛ inch vinyl composition 12 inch×12 inch tiles marketed by Olympia Tile of Toronto, Canada. Thinner vinyl tiles 28, which may be less expensive, may be used. For example, for application to a concrete floor 21, the vinyl tiles may be about 1/16 inch thick or even less. Although laid loosely, the vinyl tiles 28 should be laid tightly together so that they are not able to move around.

The ceramic tiles 30 are laid onto the floating vinyl tiles 28 and bonded thereto by the aforesaid latex-modified thinset mortar 32, and grouting, illustrated at 34, applied between the ceramic tiles 30. The grouting 34 is preferably a flexible grouting as described hereafter. The ceramic tiles 30 may, for example, be 16 inch square porcelain tiles. The tiles 30 are desirably porcelain (as opposed to other ceramic tiles) because porcelain tiles are more dense and stronger than the typical other ceramic tiles. The latex-modified thinset mortar 32 may, for example, be #52 polymer modified thinset mortar marketed by Olympia Tile of Toronto, Canada.

In order to install the backer boards 26, with the temperature at 65 degrees F. or greater, the backer boards 26, if used, or otherwise the surface of the floor substrate should be clean and free of any protrusions, bumps, or particles that may prevent the vinyl tiles 28 from lying flat, and the backer boards 26, if used, are suitably bonded with the thinset mortar 24 to the substrate 22. It is recommended that the seams of the backer boards 26 be patched with a thinset and latex add mix (latex-modified thinset mortar) that is intended to bond tile to vinyl, such as Mapei's Kerabond or Keralastic mortar, marketed by Mapei of Liverpool, N.Y., and the patch fan-dried for a minimum of 60 minutes.

In order to install the tiled floor 20 (which could utilize any suitable ceramic tile of choice), the vinyl tiles or sheets 28 are laid closely adjacent to each other with no glue or other bonding agent holding them to the surfaces of the backer boards 26 (or floor substrate, if no backer boards are used), whereby the vinyl tiles 28 "float" on the backer boards or substrate. A heat gun may be used to form the vinyl tiles 28 to the backer boards 26 (or floor substrate) in areas that are slightly uneven. Masking tape is applied to hold the vinyl tiles 28 together so they do not separate and create gaps. A suitable double-faced tape or releasable adhesive is applied underneath the vinyl tiles 28 along the edges of the floor to also prevent shifting and separation. A ¼ inch to ½ inch gap should be left around all edges of the floor to allow the room to expand and contract without causing the tile to buckle, and this gap should accordingly not be filled with thinset mortar or grout. The ceramic tiles 30 are then laid and bonded to the vinyl tiles 28 with the latex-modified thinset mortar 32 and then suitably grouted after they have properly set up.

Figure 1B:
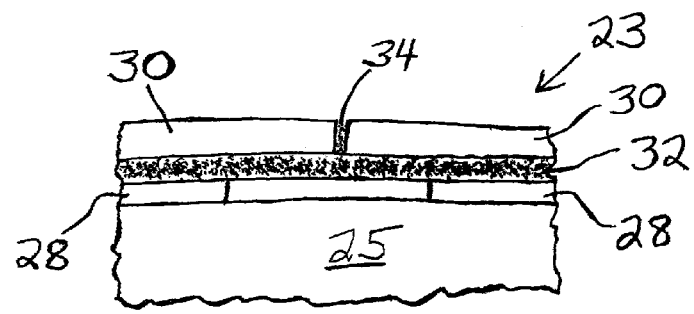
FIG. 1B is a view similar to that of FIG. 1A of the flooring portion, wherein the flooring substrate is concrete and does not include backer board.

Referring to FIG. 1B, there is illustrated generally at 23 a loosely laid ceramic floor in accordance with an alternative embodiment wherein the vinyl tiles 28 are laid loosely preferably over a concrete floor substrate 25 wherein the concrete is believed to have a rigidity to inhibit the development of tile cracking. The substrate 25 may alternatively be another suitably rigid substrate such as, for example, sufficiently rigid hardwood, not requiring the use of backer board. Preferably, in order to provide the desired rigidity, the hardwood is at least 1 inch thick, more preferably at least 1¼ inch thick.

A ceramic tiled floor similar to tiled floor 23 (i.e., over a concrete substrate) and using conventional grouting 34 has been installed experimentally in my tile store showroom for over 11 years, without my imparting to my customers the nature thereof, as a means of testing how long such a floor would hold up under normal use subjected to light foot traffic. Groups of, for example, about 16 such loose-laid tiles forming a square or the like are "trapped" within a border of ceramic strips or tiles bonded to the concrete floor with thinset mortar and grouted, whereby the "trapped" loose laid tiles are prevented from sliding. To outward appearances, the floor has had the appearance of normal ceramic tile which is usually permanently bonded to the floor and has held up without appreciable cracking of the ceramic tile. It is therefore believed that my customers and the public did not ever become aware of the experimental nature of the floor.

In order to provide a flexible grouting between the ceramic tiles to further insure against cracking of the ceramic tiles, the grouting 34 (for both concrete and wood substrates) is preferably of a type disclosed in the aforesaid U.S. Pat. No. 7,183,338 which is incorporated herein by reference and which includes polyurethane to provide the flexibility to cushion the ceramic tiles against cracking from shifting and shock loads received by the floor.

While my aforesaid showroom floor 23 has successfully withstood the light floor traffic on the concrete showroom floor with no cracks in the ceramic tile, a floor similar thereto (i.e., over a wood and backer board substrate and also using a conventional grouting and not the grouting disclosed in the aforesaid U.S. Pat. No. 7,183,338) did develop cracks when tested by the Tile Council of America (such testing (test 3) described later in this specification). Thus, there still exists a need for improved methods and articles for laying an easy to install and remove durable ceramic tile floor. Accordingly, it is a necessary object of the present invention that a laid ceramic tile floor adequately withstand foot traffic and the like as well as to have suitable crack isolation, i.e., so that the effects of small cracks in the substrate not be transmitted to and cause cracking of the ceramic tile or grouting, thus providing the necessary durability. Such improvements for providing the necessary durability as well as easy installation and removability will hereinafter be discussed.

Figure 2:
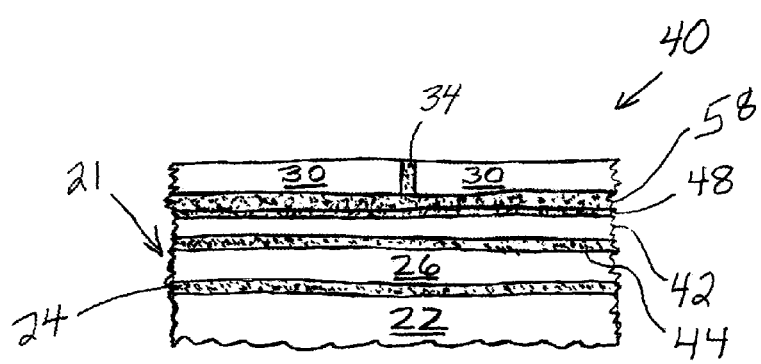
FIG. 2 is a view similar to that of FIG. 1A of a portion of flooring in accordance with an alternative embodiment of the present invention, wherein the flooring substrate includes backer board.

Referring to FIG. 2, there is shown generally at 40 a tiled floor for withstanding heavier foot traffic. The floor substrate 21 includes a wood floor 22 to which backer boards 26 have been suitably bonded with the aforesaid latex-modified thin-set mortar 24 and/or otherwise suitably attached similarly as described for the floor of FIG. 1A. In order to achieve the desired stability underneath the ceramic tiles, sheets 42 (discussed hereinafter) are suitably bonded to the backer boards 26 with a suitable adhesive 44 (discussed hereinafter), and the ceramic tiles 30 are suitably bonded to the sheets 42 as hereinafter described and suitably grouted as illustrated at 34.

Figure 3:
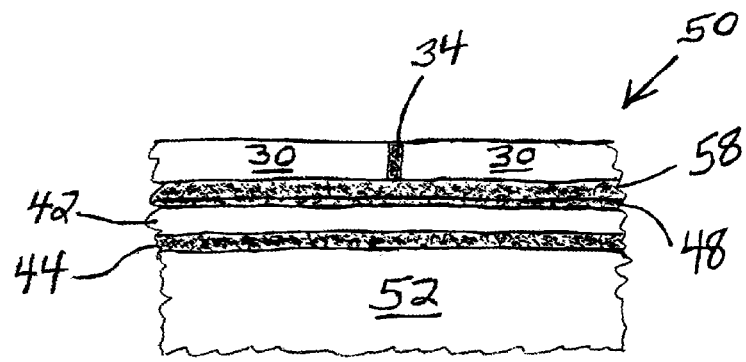
FIG. 3 is a view similar to that of FIG. 1A of a portion of flooring in accordance with the alternative embodiment of the present invention, wherein the flooring substrate is concrete and does not include backer board.

Referring to FIG. 3, there is shown generally at 50 a tiled floor wherein the floor substrate 52 is concrete or other suitably rigid substrate not requiring backer boards for strengthening thereof. The sheets 42 are accordingly bonded with the adhesive 44 directly to the concrete floor substrate 52 to thereby provide the desired stability underneath the ceramic tiles. Otherwise, the tiled floor 50 is similar to the tiled floor 40.

In order to allow easy and quick removal of the ceramic tiles 30, the sheet 42 is composed of paper or other suitable material which, while affording the desired stability under normal conditions of floor use, can tear apart or separate thus allowing the "peeling" of the ceramic tiles 30 from the floor substrate when it is desired to remove the ceramic tiles 30. The sheet 42 may, if desired, be pre-perforated or perforated (slitted) at the time of application at spaced locations (for example, every 9 to 12 inches) to allow accelerated curing time and/or easier removal of the tile 30.

Figure 6:
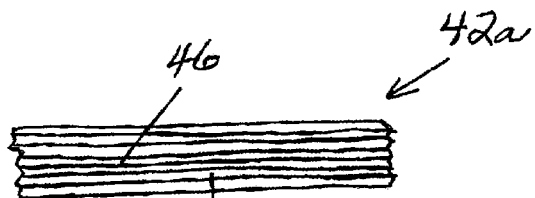
FIG. 6 is a view similar to that of FIG. 1A of an enlarged view of a sheet for the article.

Referring to FIG. 6, a preferred sheet 42 is sheet 42a which comprises a plurality of layers 46 of paper bonded together so that the layers 46 will separate one from another for removal of the ceramic tiles 30 from the floor substrate. An example of a suitable sheet 42a is Fiberock floor protection paper, which is a 12-point quality paper board marketed by United States Gypsum Company (USG) of Chicago, Ill. This paper, which has 7 layers 46 and a thickness of about ⅓₂ inch or less and with water resistance integral in all layers, is made in a wet slurry process formed by heat and pressure using a conventional paper rolling process that bonds the layers together. This paper, which is sold in 3 feet by 167 feet rolls, has conventionally been used for taping to a brand new floor (tile or wood) to protect it from damage while a home is being sold. It has a white side and a brown side. The white side should desirably face downward and is bonded to the floor substrate with the adhesive 44, which may be a suitable permanent adhesive. The brown side should desirably face upward since it has been found to appear to better receive the thinset mortar. Alternatively, when applied to backer board, it may be desired that the brown side face downwardly so as to provide better adherence between the paper and the backer board when the paper and backer board are assembled together for sale as a unit, it being found that the brown side appears to provide better adherence. The bonding of the paper layers 46 is desirably weaker than the bonding of the sheet to the floor substrate and to the ceramic tiles 30. Accordingly, when the ceramic tiles 30 are removed, the paper 42a separates such that some layers 46 remain with the floor substrate and others of the layers 46 remain with the ceramic tiles 30. Advantageously, it is then only necessary to make minor repairs to the backer board, wood, or concrete substrate, patch, and sand slightly in order to prepare the substrate to accept new tile.

Figure 7:
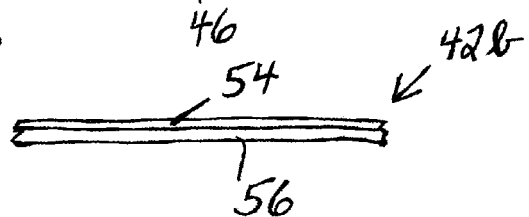
FIG. 7 is a view similar to that of FIG. 6 of an alternative embodiment of the sheet for the article.

Referring to FIG. 7, another suitable sheet 42 is a paper 42b (such as, for example, Polykraft paper) which is a coating 54 (about 0.0005 mil) of polyethylene film adhesively bonded or heat laminated to a single layer 56 (or multiple layers) of suitable paper (for example, 50# Kraft paper, supplied by various suppliers including Chudy Paper of Buffalo, N.Y.). The Polykraft paper is believed to be water resistant. The sheet 42b may have a thickness of, for example, about ⅓₂ inch or less. Its polyethylene side 54 faces the ceramic tile 30 because polyethylene bonds well to thin-set mortar, and its paper side 56 is bonded to the floor substrate with the adhesive 44, which may be a suitable permanent adhesive. For easy removal of the ceramic tile 30, the adhesive laminating the polyethylene to the paper is desirably weaker than the bonding of the sheet 42 to the floor substrate and to the ceramic tiles 30, whereby the polyethylene coating may advantageously separate from the Kraft paper. Alternatively, the paper side 56 may face the ceramic tile 30, and the polyethylene side 54 may be bonded to the floor substrate with the adhesive 44, which may be a suitable releasable adhesive or alternatively a very small amount (an amount which is enough to allow the desired sticking to the substrate but which is not so much as to prevent peeling from the substrate, i.e., so as to require, for example, only about 40 oz. of force to peel the sheet from the substrate while allowing the desired sticking to the substrate) of permanent acrylic adhesive, whereby the sheet 42b may be advantageously peeled from the floor substrate. Either way, advantageously, it should then only be necessary to make minor repairs to the substrate, patch, and sand slightly in order to prepare the substrate to accept new tile. Polykraft paper is sold in widths of about 3 feet and lengths of about 600 feet.

Another suitable sheet 42 is the above discussed Polykraft paper and a releasable adhesive, such as Taylor's 2027 adhesive marketed by W. F. Taylor Co., Inc. of Dalton, Ga., is used to apply the paper to the substrate, whereby the laid ceramic tile 30 may be easily removed by peeling the paper from the substrate. The sheets of Polykraft paper should be laid into the adhesive with the shiny polyethylene side down.

Another suitable sheet 42 is the previously discussed 6 feet wide membrane known as an Underfloor membrane marketed by Congoleum of Mercerville, N.J. and which comprises a combination of fibrous felt and pvc (polyvinylchloride) vinyl. Another suitable sheet is the previously discussed 6 feet wide membrane known as a mul membrane ("mul" is also a fibrous felt and pvc vinyl combination) which is marketed by Mannington of Salem, N.J.

In order to lay the ceramic tiled floor, with the substrate surface clean and dry and the temperature at 65 degrees F. or greater, the sheet 42 is suitably adhesively applied to the floor substrate, using a permanent or releasable adhesive 44. For application of the aforesaid Polykraft paper, use a $\frac{1}{32}$ inch by $\frac{1}{32}$ inch square notch trowel to spread out the Taylor's 2027 adhesive, then use a fan to dry the adhesive (usually takes 20 to 30 minutes, the adhesive will change from a creamy color to a clear transparent state; if you touch it with your finger tips and it transfers to your fingers, it is not dry). Alternatively, NuSpray Lock spray adhesive, marketed by The Mohawk Group of Marietta, Ga., may be used. For application of sheets 42a and 42b, use a $\frac{1}{16}$ inch square notch trowel to spread a multipurpose flooring adhesive such as Apac's #240, let the moisture wick off by letting the adhesive stand for about 10 minutes. After the respective adhesive is dry, roll out the respective sheet (42a or 42b or Polykraft) into the adhesive with the appropriate side (as previously discussed) up. Use a flat trowel to press the sheet into the adhesive while pressing out all air bubbles to the sides. Be sure edges of seams are flat, and do not let the seams of the sheets fall directly over any seams of the backer boards or other substrate seams. A knife may be used to puncture any air bubbles that won't come out. The sheets 42a and 42b should stand for about 10 minutes before setting tile, but the tile may be set immediately after the Polykraft paper has been set in place. A primer coat of suitable adhesive 48 may then be applied to the sheet 42 so that the sheet 42, if non-porous, may accept the bondant 58. If the sheet 42 is porous, then it may not be necessary to apply the primer adhesive 48. After the primer adhesive 48 has dried (or if no primer adhesive is applied due to the sheet 42 being sufficiently porous to accept the bondant 58), then the ceramic tiles 30 may be bonded to the sheet 42 by applying the bondant 58, which is desirably a thinset and latex add mix (latex modified thinset mortar) that is intended to bond tile to vinyl, such as the aforesaid Mapei's Kerabond or Keralastic mortar. The mortar should have suitable body or applied thickness to bond the ceramic tiles 30 in place. The ceramic tiles 30 are then suitably set into the mortar 58 suitably adjacent each other and allowed to set up, and, after waiting 48 hours, suitable grouting 34 is applied.

Figure 4:
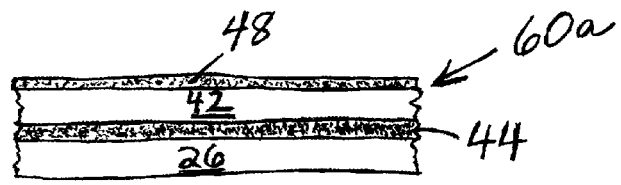
FIG. 4 is a view similar to that of FIG. 1A of a portion of an article for application to flooring in accordance with the present invention.
Figure 5:
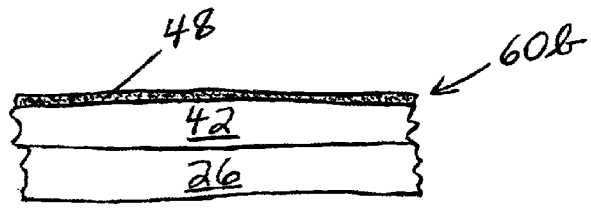
FIG. 5 is a view similar to that of FIG. 1A of a portion of an alternative embodiment of the article.

Referring to FIG. 4, in accordance with the present invention, in order to make the installation of the ceramic tiles 30 easier, an article, illustrated generally at 60a, may be provided to a consumer in which the sheet 42 has been pre-applied with the adhesive 44 to a backer board 26. Referring to FIG. 5, an alternative article 60b comprises the sheet 42 pre-applied to the backer board 26 by bonding them together in a slurry state wherein the adhesive is not used. If the sheet 42 is non-porous, the primer adhesive 48 may also be pre-applied thereto (but is not required); otherwise, the primer adhesive may not be necessary. In order to install the ceramic tiles 30, the customer may apply the backer board portion of the article 60 (either 60a or 60b) to the floor substrate 22 using the thinset mortar 24 similarly as previously discussed with respect to FIG. 2, then the ceramic tiles 30 may be applied to the sheet portion of the article 60 (either 60a or 60b) using the thinset mortar 58 and, if necessary, the primer adhesive 48, as also previously discussed. Thus, the customer is desirably spared the time-consuming step of applying the sheet 42 to the backer board 26 and may also be spared the time-consuming step of applying the primer adhesive.

Referring to FIG. 8, in accordance with an alternative embodiment tiled floor 70 of the present invention, an adhesive tape 72 is suitably applied to the backer board 26, and the ceramic tiles 30 are suitably bonded to the tape 72 using the thinset or other suitable mortar as previously discussed. Alternatively, as illustrated in FIG. 9, the adhesive tape 72 may be applied to a hardwood floor 74. As best seen in FIG. 10, the tape 72 includes a strip 76 of suitable material to which has been pre-applied a suitable adhesive 78. While the primer adhesive 48 may be pre-applied, it is preferred that the customer spray it on after the tape has been applied.

The tape strip 76 may be composed, for example, of polyethylene, which may have a thickness of, for example, 5 to 6 mils, or other suitable plastic material. Another suitable tape strip 76 is aluminum foil, which may have a thickness of, for example, 2 mils. The tape strip 76 may also be composed, for example, of rubber or synthetic rubber or other suitable material.

In order to not damage the hardwood floor 74 or other floor to which the adhesive tape 72 is applied and in order to allow easy and quick removal of the laid tiled floor, in accordance with the present invention, the adhesive 78 is a releasable or removable adhesive. Such adhesives are provided to form temporary bonds and can be easily removed after months or years, although, if not repositionable as hereinafter defined, adhesive residue is left on the adherent. When used in repositionable applications such as surface protection films, masking tapes, bookmark and note papers, price marking labels, promotional graphics materials, and skin contact (i.e, wound care dressings, EKG electrodes, athletic tape, etc.), they have insufficient shear strength (as hereinafter discussed) for laying of durable ceramic tiling. Such repositionable adhesives have low adhesion and generally cannot durably support much weight. Examples of releasable adhesives which do have sufficient shear strength for use in the present invention (not repositionable) include the aforesaid Taylor's 2027 adhesive and Mannington's MT711 adhesive, when applied in minimal quantity, i.e., a minimal amount of adhesive applied with, for example, a short nap (such as ¼ inch thick) paint roller. If too great of quantity is applied, these adhesives can undesirably be applied so as to provide a permanent bond. The releasable adhesive 78 releases best from non-porous surfaces such as a urethane-finished wood or polyethylene-finished wood or other non-porous or high gloss hardwoods or substrate surfaces. Accordingly, a urethane or polyethylene or other high gloss finish should desirably be applied to a substrate before the tape 72 is applied thereto. Releasable refers to the ability to remove an object such as a sheet or membrane from a surface (substrate) without damage to the surface. Only moderate or minimal peeling force is required for such removal, as contrasted with a permanent bond which leaves damage to the surface even if the object can be peeled therefrom. As used herein and in the claims, a "releasable adhesive" is one which, as applied, allows a sheet or membrane which is attached to a substrate by the adhesive to be dis-adhered or released from the substrate upon application of peeling force without damage to the substrate and thus forms a non-permanent bond with the substrate, and when a sheet or membrane is bonded to a substrate with an adhesive which is releasable as so applied, it is said to be "releasably adhered" to the substrate. In contrast, a contact or self-stick or other adhesive may be of a type which, as applied, forms a permanent or non-removable bond, or a bond which is so difficult to remove that its removal results in damage to the substrate, and should therefore not be considered to be a releasable adhesive but instead be considered to be a permanent adhesive.

Suitable adhesive aluminum foil tape 72 may, for example, be a 2-mil thick aluminum foil tape, marketed by Walco Corporation of glenshaw, Pa., with acrylic adhesive which (though it is considered to be permanent when it is applied to non-porous steel wherein it has an adhesion strength of about 40 ounces per square inch) is considered to be releasable when applied to a concrete substrate. Another suitable aluminum foil tape 72 may, for example, be aluminum foil tape #425 (ID #70-0063-8599-4) marketed by 3M corporation and having a similar acrylic adhesive and provided in widths up to 40 inches, and typically used for heat protection around duct work.

The adhesive tape 72 should desirably be wide enough to make application efficient but not so wide that it is unwieldy. In accordance with the present invention, the adhesive tape 72 has a width, illustrated at 81 in FIG. 11, which is at least about 22 inches, preferably between about 22 and 54 inches, for example, about 30 inches. While the length, illustrated at 82, is not critical, the length 82 may, for example, be about 80 feet.

In order to form the ceramic tiled floor 70 or 80 using the releasable adhesive tape 72, with the substrate surface clean and dry and with the temperature at 65 degrees F. or more, proceed to cover the substrate surface with the releasable adhesive tape 72, taking care not to let the seams of the tape fall directly over any backer board or wood seams, but it is OK to overlap the edges of the tape. Although it is OK to lift and reposition the tape in order to remove bubbles, it is suitable to just puncture a bubble with a knife, and it is unnecessary to remove very tiny air bubbles. Too much lifting and repositioning of the tape may jeopardize the bonding quality of the adhesive. Use a very slightly damp rag or sponge to wipe off any dust or dirt, and use a wire brush to scuff up the surface of the tape while pushing out most of the remaining air bubbles and pressing the tape into the substrate more securely. The tape may then be immediately sprayed with the primer adhesive 48 (optional) and the adhesive allowed to dry. Then apply the thinset mortar and lay the ceramic tile 30 in place. Although a latex modified thinset mortar can be used, it is recommended that the mortar be the aforesaid thinset and latex add mix that is intended to bond tile to vinyl, such as Kerabond mortar and Keralastic latex add mix marketed by Mapei of Liverpool, N.Y. It is recommended to then wait 48 hours before grouting.

Figure 12:
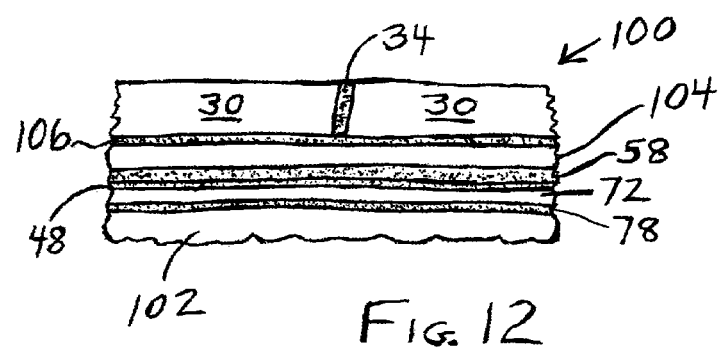
FIG. 12 is a view similar to that of FIG. 1A of a portion of flooring in accordance with the another embodiment of the present invention, wherein the flooring substrate is hardwood.

Referring to FIG. 12, there is illustrated generally at 100 flooring in which the ceramic tiles 30 are applied to a hardwood floor 102. A hardwood floor, if not already strong and rigid enough, may require the addition of a strengthening membrane in order to have sufficient strength or rigidity for the application of the ceramic tiles 30. Yet the use of nails for applying backer board to a hardwood floor would damage the hardwood. In order to prevent such damage, in accordance with the present invention, the tape 72 is releasably bonded directly to the hardwood floor 102, as previously discussed, and a suitable strengthening membrane 104 is suitably bonded to the tape 72 (to which the primer adhesive 48 is applied, if needed). A suitable membrane 104 may be Ditra matting marketed by Schluter Systems L.P. of Plattsburg, N.Y., and it may be bonded to the aluminum tape 72 with the thinset mortar 58, which may, for example, be #254 mortar provided by Laticrete International Inc. of Bethany, Conn. or may be the aforesaid Mapei Kerabond mortar with Keralastic latex add mix. The ceramic tiles 30 are then suitably bonded to the membrane 104 with bondant 106, which may, for example, be the Mapei Kerabond mortar with no add mix, and suitably grouted. In order to remove or replace the ceramic tiles 30 at a date months or years later, the tiles 30 along with the membrane 104 are stripped from the tape 72. The tape 72 is then removed without leaving other than perhaps a small amount of residue, which is then removed. Since no nails or screws or mortar is used during installation of the ceramic tiles 30, the hardwood floor 102 desirably need only be suitably sanded and refinished for use. If the hardwood floor is suitably strong and rigid enough, the ceramic tiles can of course be bonded directly to the aluminum foil.

Figure 13:
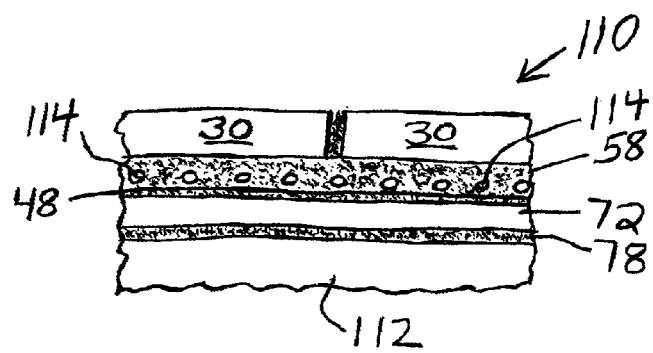
FIG. 13 is a view similar to that of FIG. 1A of a portion of flooring in accordance with the another embodiment of the present invention.

Referring to FIG. 13, there is illustrated generally at 110 heated flooring in which the ceramic tiles 30 are applied to any suitable floor substrate, illustrated generically at 112. An electric heating system illustrated by wires 114 but which may be in any other suitable form such as matting is provided to underlie the ceramic tiles 30 for heating thereof. In order to increase the efficiency of the heating system 114, in accordance with the present invention, the aluminum foil tape 72 is applied to the floor substrate 112 to underlie the heating system 114 so that the heat reflective qualities of the aluminum foil tape can prevent or reduce heat loss by preventing or reducing heat from being absorbed into the substrate 112. While the heating system 114 is illustrated within the thinset mortar 58 (which may be latex-modified), it should be understood that it may otherwise be suitably installed within the ceramic tile flooring 110. While the tape 72 for this purpose is described as aluminum tape, it should also be understood that it may be any other suitable tape having the desired heat reflective qualities and may be suitably applied to the substrate 112 otherwise than by the releasable adhesive 78.

Figure 14:
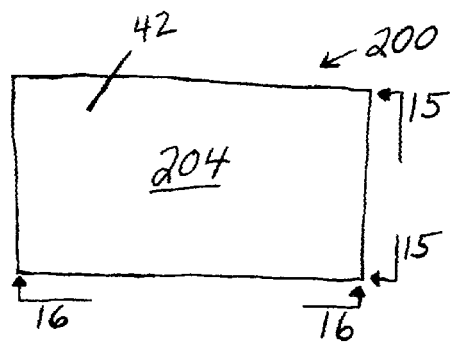
FIG. 14 is a plan view of an alternative embodiment of an article for application to flooring.
Figure 15:
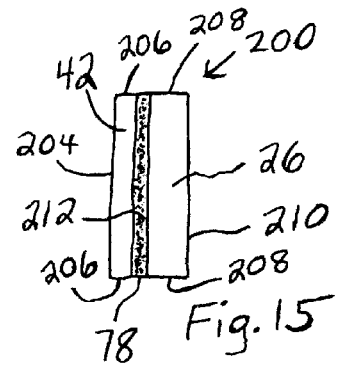
FIG. 15 is an edge view of the article of FIG. 14 taken along lines 15-15 thereof.
Figure 16:
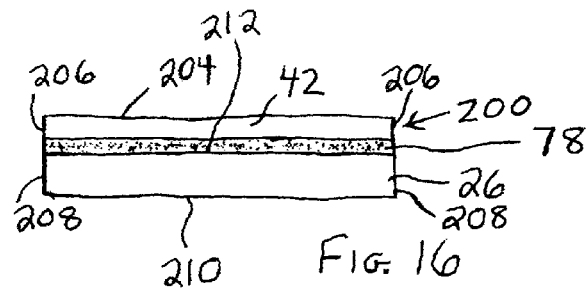
FIG. 16 is an edge view of the article of FIG. 14 taken along lines 16-16 thereof.
Figure 17:
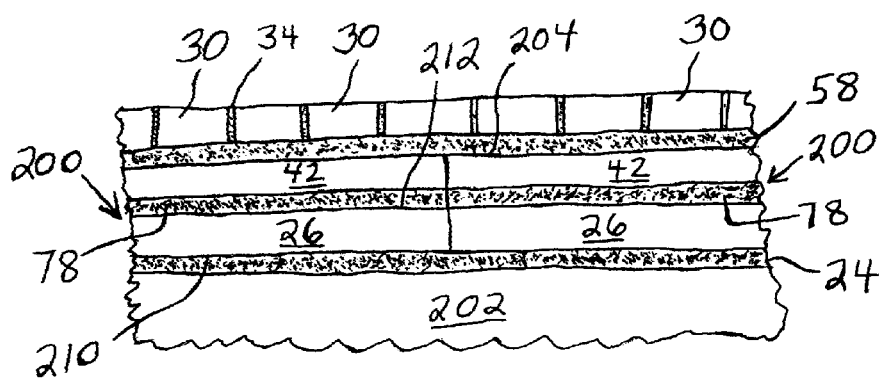
FIG. 17 is an edge view of a portion of flooring with a pair of the articles of FIGS. 14 to 16 applied thereto and with tiles applied thereto.

Referring to FIGS. 14 to 16, there is illustrated generally at 200 a pre-fabricated article in accordance with another embodiment for application to a wood floor substrate or other suitable floor substrate, illustrated at 202 in FIG. 17, to provide a surface 204 upon which the ceramic tiles 30 may be laid for later easy removability thereof when it is desired to replace the tiles (i.e., rather than repositioning thereof). Thus, while the adhesive 78 is releasable so that the tiles can be easily and quickly replaced with new tiles, it is not repositionable, i.e., it can be used to adhere the sheet 42 to a substrate once and only once, after which the adhesive loses all or most of the tackiness necessary to re-adhere the sheet to the substrate (or other substrate) and provide the needed shear strength for crack isolation (discussed hereinafter). However, a portion of the sheet or membrane may be slightly lifted and re-flattened for the purpose of eliminating ripples or bubbles as the sheet is being adhesively laid one time (as contrasted with picking up the entire adhered sheet and laying it back down a second time) without the adhesive being considered to be repositionable. Though releasable, the adhesive must adhere with enough shear strength to achieve the necessary crack isolation for a ceramic tile floor so that the floor is commercially viable, and, if it is repositioned, it is believed that the adhesive will lose most or all of its tackiness and thereafter have insufficient shear strength to achieve the necessary crack isolation, as hereinafter discussed with greater specificity. For the purposes of this specification and the claims, the term "not repositionable" with respect to an adhesive adhering a sheet or membrane to a substrate is defined as the inability of the adhesive to allow the following: the sheet or membrane to be moved or shifted from a position or location on the substrate surface and positioned in a new position or location on the same or other substrate surface without resulting in the removal of any substantial adhesive from either the sheet or membrane or the same or other substrate surface and without resulting in the addition of any substantial new adhesive to either the sheet or membrane or the same or other substrate surface. I am satisfied by the hereinafter described testing (particularly tests 1 to 4) that if the adhesive has enough shear strength to achieve satisfactory crack isolation for commercial use, then it will be "not repositionable." For the purposes of this specification and the claims, a releasable adhesive (as hereinbefore defined) as applied to bond a sheet or membrane to a substrate surface will be considered to be "not repositionable" if (1) as applied, it has a shear strength of at least 12 psi (pounds per square inch), or (2) it is able to provide crack isolation for cracks developing in the substrate having a gap width of 1/16 inch. A detailed discussion of shear strength and crack isolation and the testing resulting in the above qualifications for "not repositionable" follows.

The membrane must be sufficiently flexible to follow contours or unevenness or undulations or other slight inconsistencies in the substrate in order to create proper support under the ceramic tile when the mortar is applied. Thus, when the mortar is applied to the membrane as normally spread with a notched trowel thereby providing needed ridges in the mortar then the tile pressed into the mortar and a beat-in block and rubber mallet used to depress the mortar, it fills in these inconsistencies to allow such proper support under the tile. Without the mortar and these ridges, the inconsistencies may not be adequately filled in. If the inconsistencies are not adequately filled in, it may result in cracked tile due to foot traffic and may not pass a crack isolation test. If the tile and mortar and membrane unit were to be picked up and attempted to be repositioned at another location on the substrate, the inconsistencies at the new location would not allow such proper support resulting in cracks and failure of the repositioned unit. If the membrane by itself (before the mortar and tiles were applied) were to be picked up and attempted to be repositioned at another location on the substrate, much of the releasable and not repositionable adhesive would remain on the floor at the original location with the result of the remaining adhesive having insufficient shear strength when re-applied at the new location so that it would no longer be effective to withstand foot traffic and provide crack isolation. Of course, the substrate should be adequately cleaned before application of the adhesive to prevent contamination with dirt or dust on the substrate.

Adhesive strength may be measured in terms of peel strength (grams per millimeter, i.e., gm/mm), loop tack (gm/mm), shear strength, and pivot strength. As discussed in "Removable Pressure Sensitive Adhesive Products," Technical Bulletin PCP 002, Prathith Consultants of B801 Vastushree Pearl, Paul Road, Kothrud, Pune 411038. Ms. India (psadhesives.com), Jan. 9, 2014, for comparison purposes, a permanent adhesive may have a peel strength of greater than 2,000 gm/mm, a loop tack of about 1,400 gm/mm, and with high shear strength. Shear strength and pivot strength are considered to be the most important characteristics for crack isolation since it is what allows the membrane to be held in place so that it does not move (translate or pivot). Without wishing to be bound by theory here or elsewhere in this specification, it is believed that the ability of the sheet or membrane to resist translation or pivoting movement as a crack propagates in the substrate is a primary determinate in preventing the crack propagation from effecting cracks in the ceramic tiles or grouting, i.e., for effectuating adequate crack isolation. The adhesive as applied should also have sufficient peel strength such as at least about 2 psi to resist normal wear and tear.

A repositionable adhesive (which by definition is also releasable) has a peel strength of about 90 to 100 gm/mm, a loop tack of about 250 gm/mm, low shear strength (said to be so low that it is generally not measured), and low pivot strength. If an adhesive has high enough shear strength so as not to be repositionable or to provide crack isolation, it is believed that its pivot strength will also be high enough so as not to be repositionable or to provide crack isolation, since pivot strength is considered to be dependent on sheer strength or at least generally increasing and decreasing as the sheer strength increases or decreases. It is believed that repositionable adhesives have a shear strength on the order of 1 psi, which it is believed is way too low of shear strength to suitably achieve the desired crack isolation.

An example of a releasable and not repositionable adhesive is provided in the aforesaid U.S. Pat. No. 3,691,140 as an aerosol spray adhesive which generally comprises a solvent dispersion of cross-linked rubbers or acrylates. Such an adhesive is said therein to permit paper to be removed from a substrate to which it is adhered, without tearing, however, it does not permit re-bonding. As previously discussed, Taylor's 2027 adhesive, and Mannington's MT711 adhesive, are examples of suitable releasable adhesives (except they can become permanent if too much adhesive is applied, so for them to be releasable, minimal adhesive should be applied with a short nap paint roller, i.e., ¼ inch thick), and such adhesives, providing sufficient adhesion for providing the needed stability and crack isolation, as previously discussed, are not repositionable.

A releasable and not repositionable adhesive is distinguished from the releasable and repositionable adhesive disclosed in U.S. Pat. Nos. 3,691,140 and 5,194,299, which are incorporated herein by reference and which are related to the well known 3M repositionable post-it notes, wherein the post-it notes utilize an adhesive which allows the notes to be detached and rebonded repeatedly. As discussed in the above Technical Bulletin, such a repositionable adhesive consists of tacky crosslinked acrylic microspheres which make point contact with a paper substrate and which are held together by a polymeric binder. Due to the presence of the microspheres and discontinuous morphology, the adhesive does not completely wet the substrate to which it is applied, resulting in the lower adhesive strength. The microspheres are about 10 to 250 microns in diameter, which is much larger than the emulsion particles found in conventional adhesives. Such microsphere adhesives form a discontinuous film which limit physical contact, thus providing the low adhesive strength.

Applicant has tried two types of spray adhesives supplied by Spray Lock, Inc. (formerly Interlock Industries, Inc.) of 5959 Shallow Ford Road, Suite 405, Chattanooga, Tenn. 37421, having a web site at spraylock.com, one of which is identified as Spray Lock's number 3500 commercially publicly available and the other of which was formulated for Applicant and which provides a higher shear strength (discussed hereinafter). Both spray adhesives are water-based acrylic adhesives. Both spray adhesives were determined during testing (hereinafter described) to provide satisfactory shear strength for achieving the necessary crack isolation for at least light commercial use. Another releasable and not repositionable adhesive which is believed to be suitable for the present invention is identified as Henry #630 adhesive supplied by W.W. Henry Co., 400 Ardex Park Dr., Aliquippa, Pa. 15001.

The 3500 Spray Lock spray adhesive has, as specified by Spray Lock, a shear strength of about 12 psi after 24 hours after application with the adhesive applied per Spray Lock's instructions for use (discussed hereinafter). The other Spray Lock spray adhesive discussed above has, as specified by Spray Lock, a shear strength of about 22 psi after 24 hours after application with the adhesive applied per Spray Lock's instructions for use. Based on the hereinafter test results for crack isolation, each of the above Spray Lock adhesives is considered to be a suitable releasable and not repositionable adhesive for the present invention. Thus, a suitable adhesive for the present invention has a shear strength of at least about 12 psi, for example, between 12 and 22 psi, it being understood that these are based on shear strength measurements after 24 hours after application and following the manufacturer's instructions for use. Beyond 24 hours after application, the shear strengths increased and are normally expected to increase. Thus, the adhesive of the present invention must "walk the thin line" between having sufficiently low adhesive strength to permit the desired easy and quick ceramic tile replacement yet have sufficiently high adhesive strength (particularly shear and pivot) to achieve the necessary crack isolation as well as stability for commercially viable ceramic tile floors.

Unless otherwise specified or otherwise understood from the context, references herein to releasable adhesive are meant to refer to "releasable and not repositionable" adhesive.

While a floor laid with ceramic tile using such a releasable and not repositionable adhesive has advantageously been shown in testing to provide the necessary crack isolation (discussed hereinafter) to achieve a sufficiently durable ceramic tile floor, it is believed that the weaker quality of adherence (low shear strength and low pivot strength) of a releasable and repositionable adhesive (as in the 3M post-it notes and as suggested by U.S. published application 2008/0010930 to Mao at paragraph 0050) may not provide the needed crack isolation (see the hereinafter test 4) which is so critical to providing acceptably durable and long lasting ceramic tile floors. Thus, in order to provide the needed crack isolation in a floor, the adhesive 78 in accordance with the present invention is a releasable and not repositionable adhesive.

The article 200 includes a backer board 26 which has a lower surface 210 for attachment to the floor substrate 202 and an upper surface 212 to which is adhesively attached a sheet 42 by means of a releasable adhesive 78. The article 200 is pre-fabricated for sale to, for example, a floor installer or homeowner so as to ease and simplify the installation of the ceramic tiles particularly to a wood floor on-site.

The installation process involves applying the backer boards 26 edge-to-edge to the existing floor substrate 202 such as by use of the thinset mortar 24 or otherwise as is suitable. The thin-set mortar 58 (or other suitable bondant) is applied to sheets 42 and the ceramic tiles 30 applied edge-to-edge with suitable grouting 34 there between as previously discussed to bond the tiles 30 to the sheets 42. As illustrated in FIG. 17, the tiles 30 may be laid to overlap edges of the backer boards 42.

The sheet 42 preferably comprises the previously discussed Polykraft paper, and the releasable adhesive 78 should desirably releasably bond its polyethylene non-porous side to the backer board 26 so as to allow its easier removal because a non-porous side should more easily release.

The sheet 42 and releasable adhesive 78 may alternatively comprise the aforesaid adhesive tape 72 including the strip 76 with the releasable adhesive 78 pre-applied (to a suitable side of the sheet, for example, for Polycraft paper to either side but preferably to its non-porous side for release more easily, then a liner applied to protect it as it is rolled up) or applied during the manufacturing process of the article 200.

The sheet 42 with the pre-applied releasable adhesive 78 may be used on any substrate.

It is important that little or none of the bondant 58, which is not releasable, come into contact with the backer boards 26 since the bondant 58 in contact with the backer boards, if more than minimal contact, would make removal of the tiles 30 and sheets 42 difficult and may require repair to the backer boards. In order to avoid such contact, in accordance with the present invention, the sheet 42 covers the entirety of the upper surface 212 of the backer board 26, as illustrated in FIGS. 14 to 17. Thus, the edges 206 of the sheet 42 extend out to and are co-extensive with the respective edges 208 of the backer board 26 on all sides, whereby when the articles 200 are laid edge-to-edge, as illustrated in FIG. 17, there is virtually no space for the bondant 58 to penetrate beyond the sheet 42 to come into contact with the backer board 26. However, it should be understood that the respective edges need not be perfectly aligned and that there could be de minimus or insignificant gaps between respective edges or otherwise (distance which an edge 208 overlaps a corresponding edge 206 or even a void or slit in the sheet 42) which could allow only an insignificant penetration of the bondant 58 to the backer board 26, necessitating only insignificant repair, if any, of the backer board 26. For example, a gap up to about ½ inch between respective edges 206 and 208 would be considered insignificant. For the purposes of this specification and the claims, the term "entirety" is defined so that the sheet 42 still covers the entirety of the upper surface 212 of the backer board 26 even though there is one or more such gaps which are in total de minimus and do not significantly affect the quality of the article 200.

When it is desired to replace the ceramic tiles 30, they and the sheet 42 may be easily "peeled" from the backer boards 26 which should then be in condition for applying new ceramic tiles in accordance with the discussion herein. For example, the adhesive tape 72 may be applied followed by bonding of the new tiles thereto as previously discussed. If desired, it is perceived that new articles 200 may be suitably applied to the old backer boards 26.

Figure 18:
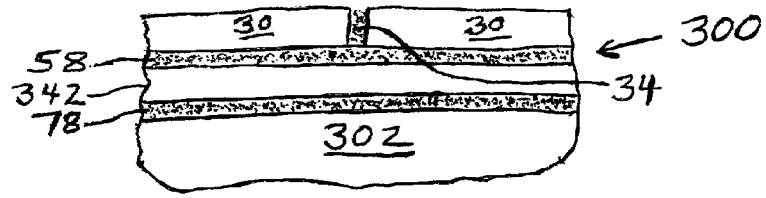
FIG. 18 is an illustration of an edge view of an alternative embodiment of flooring which embodies the present invention.

Referring to FIG. 18, there is illustrated generally at 300 flooring comprising ceramic tiles 30 applied to a floor substrate 302 in accordance with an alternative embodiment of the present invention. The floor substrate 302 may, for example, be a concrete or hardwood floor, as illustrated at 25 in FIG. 1B, or a wood floor 22 to which strengthening backer boards 26 have been applied, as illustrated in FIG. 1A. In accordance with the present invention, the ceramic tiles 30 are bonded (as hereafter discussed) to a suitable sheet or sheets 342 which may be vinyl tiles or vinyl sheets or sheets similar to any of the sheets 42, including pvc, paper, etc. The sheet or sheets 342 are bonded to the floor substrate 302 once and only once with the releasable and not repositionable adhesive 78 so as to provide the desired stability (to provide the critically necessary crack isolation and prevent the sheets from shifting, sliding, or separating either before the ceramic tiles are bonded to the sheets or afterward due to foot traffic or the like, which it is believed is not achievable if the adhesive were repositionable, while allowing easy removability of the ceramic tiling for replacement with other ceramic tiles with little or no damage to the floor substrate.

Desirably, a suitable amount of the releasable adhesive 78 is applied over the entire floor substrate 302, and the sheets 342 are then laid into the adhesive 78, thereby allowing the sheets to be releasably adhered to the substrate 302. The releasable adhesive 78 is desirably applied to a thickness which is sufficient to provide the desired stability. For a non-porous sheet (referring to the side of the sheet that faces the adhesive), a thickness of $1/64$ inch or less may be considered to be insufficient, while a thickness of about $1/32$ inch or more is considered to be sufficient. For a porous sheet (again referring to the side of the sheet that faces the adhesive), a thickness of $1/64$ inch or less may be considered to be sufficient, although a thickness of about $1/32$ inch or more may be preferred. The releasable adhesive 78 is accordingly preferably applied with a trowel with a 1/32 inch notch to suitably achieve a thickness of about 1/32 inch. The releasable adhesive 78 should be thoroughly dry (for example, changes from a creamy to a clear color and does not transfer to the fingers on touch) before the sheets 342 are applied.

Alternatively, the releasable adhesive 78 may be pre-applied to the sheet 342. Thus, the sheet 342 and the releasable adhesive 78 may constitute a tape, i.e, the adhesive tape 72 which, as necessary, may have a backer member, such as illustrated at 420 in FIG. 22, which is removed before application of the adhesive tape 72 (sheet 342 and pre-applied releasable adhesive 78) to the substrate 302.

The latex modified thinset mortar 58 (which is sometimes referred to as polymer modified thinset mortar, as opposed to non-modified thinset mortar, and/or which may have a similar composition and similar strength, and which is therefore meant to include, for the purposes of this specification and the claims, polymer modified thinset mortar) is preferably used to bond the ceramic tiles 30 to the sheets 342. In order to achieve a strong bond particularly if the sheets 342 are non-porous, a scratch coating or primer adhesive 48 (not shown in FIG. 18), which is a very thin coating created with a flat or non-teeth edge of a trowel, is first applied (if not already pre-applied by the sheet manufacturer), then allowed to dry for on the order of an hour to remove tackiness, then a layer of suitable thickness of the latex modified thinset mortar 58 (or if desired polymer modified thinset mortar) is applied. The mortar 58 should have suitable body or applied thickness to bond the ceramic tiles 30 in place. The ceramic tiles 30 are then suitably set into the mortar 58 suitably adjacent each other and allowed to set up, and, after waiting perhaps about 48 hours, the grouting 34 is applied.

Figure 21:
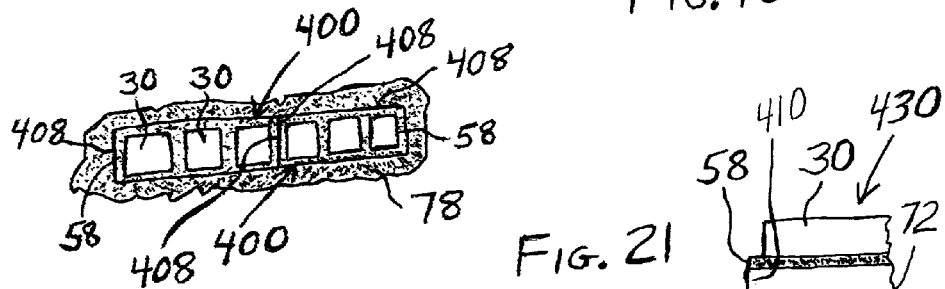
FIG. 21 is a plan illustrative view of the articles of FIG. 19 applied (prior to grouting) to a floor substrate.

When the mortar is applied in-situ during the tile installation process, the mortar must be allowed to dry so that the ceramic tiles can be stepped on before the grouting can occur. As discussed above, this undesirably requires waiting perhaps about 48 hours. Referring to FIGS. 19 to 22, in order to provide easier installation at the job site as well as to allow immediate grouting upon laying of the ceramic tiles 30 (which may be any ceramic tile of a customer's choice), in accordance with the present invention, a composite article, illustrated generally at 400, comprising a sheet 402, which may be similar to any of sheets 28 and 42 and 342, to which a ceramic tile 30 is bonded by bondant 58, is prefabricated preferably off-site (i.e., at a manufacturing facility or other location which is not the location where the article is to be installed) and transported to the job site for installation. By "prefabricated" is meant that it is fabricated before it is installed on a floor. The installed articles 400 (prior to grouting) are illustrated in FIG. 21 and an alternative embodiment thereof at 430 in FIG. 22.

Figure 19:
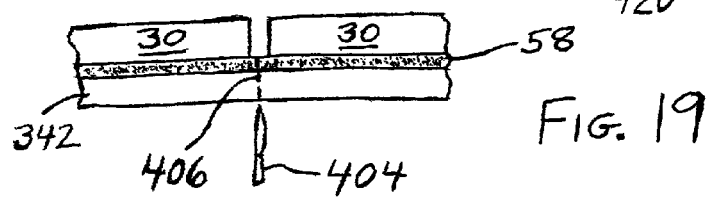
FIG. 19 is an illustration of an edge view illustrating the making of articles for application to a floor substrate in accordance with the present invention.

A method of pre-fabrication of the composite article 400 is illustrated in FIG. 19. Spaced ceramic tiles 30 are bonded with bondant 58 (including a scratch coating if needed, as discussed with reference to FIG. 18, and which may alternatively be a polymer modified thinset mortar) to a sheet 342. The tiles 30 are spaced apart the desired distance to suitably allow for grouting therebetween.

After bonding of the ceramic tiles 30 has adequately occurred (for example, about 24 hours), the sheets 342 are then cut, as with knife 404, as illustrated by dashed line 406 forming edges 408 (FIGS. 20 and 21), between tiles 30 with the tiles remaining attached to the cut portions respectively of the sheet 342 to form the composite articles 400 each containing one or more (for example, three, as shown in FIG. 21, for each of two articles 400) ceramic tiles 30 bonded to the portions 402 respectively of sheet 342. While the articles shown in FIG. 21 each comprises one row of 3 tiles, it should be understood that an article 400 may have any suitable arrangement of tiles, such as, for example, 2 rows of 4 tiles. Alternatively, the sheets 402 may be pre-cut to the desired size for a composite article 400. Pre-grouting can be done but only in a space between a pair of tiles of the same composite article 400. Thus, some grouting, i.e., in spaces where the composite articles 400 abut, will still have to be done after the composite articles 400 are laid.

Figure 20:
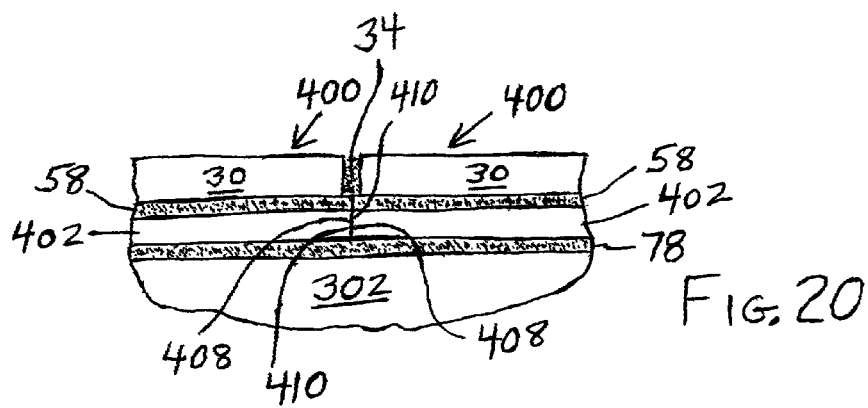
FIG. 20 is an illustration of an edge view of the articles of FIG. 19 applied to a floor substrate.

It is important that grout not come into contact with the floor substrate 302 which would make removal of the ceramic tiles for replacement difficult and may cause damage to the floor substrate during such removal. In order to prevent such contact of the grout with the floor substrate, the composite articles 400 are formed with the overlapping sheet portions 410, and they are laid at the installation site with the sheet portions 410 abutting to act as a barrier to the grout 34 contacting the floor substrate 302, as seen in FIG. 20, leaving space for the grouting 34 between a ceramic tile 30 of one article 400 and an adjacent ceramic tile 30 of an adjoining article 400. It should be understood that there need not necessarily be an overlapping sheet portion for each article edge and that it is only necessary that, for a tile of one article and an adjacent tile of another article to be grouted there between, the total of overlap should equal the gap there between to be grouted. Thus, if one of the tiles has no overlapping sheet portion, then the sheet portion for the adjacent tile in the adjoining article should have an overlap equal to the total gap between the two tiles. After the grouting (if any is done at the fabrication site) has dried for at least 7 days or other suitable time, the composite articles 400 may be transported to the installation site and laid into the releasable adhesive 78 (after it has been applied and allowed to dry thoroughly) so that their sheet edges 408 abut. If no grouting is applied at the fabrication site, then the waiting period for grout drying is of course not required. Advantageously, once the articles 400 are laid, the grouting 34 (or remainder of the grouting) may immediately be applied between the ceramic tiles 30 and then allowed to dry.

Figure 22:
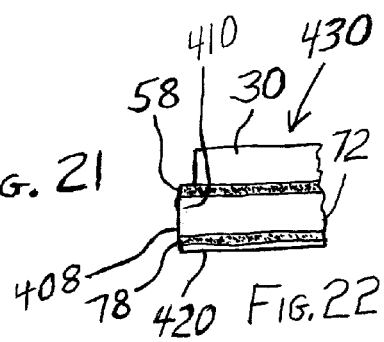
FIG. 22 is a partial edge view of an alternative embodiment of the articles of FIG. 19.

Referring to FIG. 22, an alternative composite article 430 may have a tile or plurality of tiles 30 pre-applied to a tape 72 comprising, as previously discussed, a sheet 28 or 42 or 342 or 402 and the releasable adhesive 78, with a peelable backing strip or liner 420, similarly as previously discussed with respect to FIGS. 19 to 21 for bonding the tiles 30 to the sheet 342. It should be understood that it is within the scope of the present invention to apply the adhesive tape 72 to a sheet and to bond the sheet to the tiles. by suitably bonding to sheet 402 the previously described tape 72 having the releasable adhesive 78 adhered thereto. After removal of the backing strip 420, the articles 430 are laid in position, with their sheet edges 408 abutting, so as to adhere to the substrate.

The grouting 34 is preferably a non-Portland cement grout, more preferably the previously discussed polyurethane grouting to provide the flexibility to cushion the ceramic tiles 30 against cracking from shifting and shock loads received by the floor 302. Alternative grouts 34 are acrylic and epoxy and could be a Portland cement grout. Polyurethane grouting is stronger and also desirably provides better stain resistance than acrylic grouting and is also color consistent. Epoxy grouting has the desired strength but is less flexible than polyurethane grouting with the result that cracking is more likely to occur with epoxy grouting. Such polyurethane grouting is available from Starquartz Industries, Inc. of Baltimore, Md.

The composite articles 400 and 430 are provided to allow the installation of ceramic tiles of the customer's choosing and to desirably greatly reduce the time needed for installation at the installation site. Advantageously, grouting may be conducted immediately after laying the composite articles (rather than having to wait 48 hours for thinset mortar to dry). It is also considered advantageous for a worker to be able to spread thinset and set the tile while standing at a table rather than having to kneel on the floor for 8 hours a day, saving wear and tear on his or her knees and back. The releasable adhesive 78 is used to desirably afford the necessary stability to the laid tiles and desirably allows the tile to be easily and quickly removed for replacement without appreciable damage to the floor substrate.

With use of the tape 72 (combination as previously discussed of the sheet 342 with the releasable adhesive 78 preapplied), which may be called a tile releasing membrane, the installation process, which can be easily done by a homeowner, is provided to be easy and inexpensive and provide what might be called performance without permanency. See Applicant's website www.nuetile.com. Thus, referring again to FIG. 18, the backing strip 420 (illustrated in FIG. 22) is removed to expose the releasable adhesive 78, and the tile releasing membrane 72 laid onto the cleaned and prepared substrate 302, whether backerboard or concrete, then the tile installed directly over the tile releasing membrane with the thinset mortar and grouted. The placement of the tile releasing membrane 72 may be adjusted one time if needed, i.e., a portion may be slightly lifted and re-flattened for the purpose of eliminating ripples or bubbles, but of course the membrane may not be lifted after being adhered and repositioned. The tile releasing membranes 72 are provided to greatly reduce the time, effort, and mess otherwise associated with removing ceramic tile. The tiles may very often come up in one piece, allowing for easy repair of cracked tiles. Little or no damage may be done to the substrate 302, so as soon as the removal process is complete, simply clean and prepare the substrate and reapply the tile releasing membrane and install the tile. The process is provided to be so easy and inexpensive that one is no longer stuck with one fashion for decades, and now one can have the peace of mind that ceramic tile offers his or her home for as long as he or she chooses to keep it.

Alternatively, the prefabricated articles 400 or 430 may be quickly and easily applied to the substrate 302.

As previously discussed, a critical characteristic of a ceramic tile floor, whether or not the tiles can be easily and quickly removed for replacement, is that it have suitable crack isolation. Thus, if a crack develops in the substrate, the laid tiles must be able to substantially remain isolated from and withstand the effects of the crack so that the ceramic tiles and grouting do not crack and break apart, ruining the ceramic floor. The critical characteristic of the adhesive 78 for achieving crack isolation is considered to be its shear strength, i.e., its ability to hold in place and not translate (as well as the related pivot strength) when subjected to stresses such as propagating cracks in the substrate 302. Crack isolation is also required for the bonding of the ceramic tiles 30 to the membrane, and this is more than adequately provided by the mortar 58 (as well as mortar 658 in FIG. 24). It is believed that the shear strength provided by a repositionable adhesive (such as that used in the previously discussed 3M post-it notes or any of those repositionable adhesives discussed in U.S. published application 2008/0010930 to Mao, which is hereby incorporated herein by reference, which as previously discussed are believed to be on the order of 1 psi (pounds of force per square inch), is insufficient to provide the critically necessary crack isolation. On the other hand, permanent adhesives do not allow the membrane with its attached ceramic tile to be quickly and easily released from the substrate for replacement with new ceramic tile as well as a new membrane. Accordingly, in accordance with the present invention, in order to allow quick and easy removal of ceramic tile for replacement while also providing the critically necessary crack isolation, the adhesive 78 is one which is releasable and not repositionable. Tests of releasable and not repositionable adhesives to determine whether the requisite crack isolation is met are described in the following testing, all conducted by the Tile Council of North America, Inc. (also referred to herein as TCNA) of 100 Clemson Research Blvd., Anderson, S.C. 29625.

Test 1: TCNA-304-14 of Jul. 18 to 21, 2014

The test method used was ASTM C627 titled "A Standard Test Method for Evaluating Ceramic Floor Tile Installation Systems Using the Robinson-Type Floor Tester." TCNA supplied a concrete base (substrate) with a smooth finish with a nominal size of 48"×48'×2" (1219 mm×1219 mm×51 mm), 12"×12" Crossville porcelain tile (product code A850), and a custom Polyblend sanded grout (product code 1485901407LS). Applicant supplied the tile release spray adhesive (Applicant's product code 021314B-1), the tile release membrane, and a custom Prolite thin-set tile and stone mortar (product code 1407902L) provided by Custom Building Products, 1300 Seal Beach Blvd., #200, Seal Beach Calif. 90740.

The adhesive used was the previously described 3500 Spray-Lock water-based acrylic spray adhesive, which was applied in what may be called "clumps" so that it covered approximately 20% of the surface area of the portion of substrate to which it was applied, per Spray Lock's instructions for use. This adhesive was tested by Spray Lock (using a TestResurses 1000M tensiometer) as thusly applied in accordance with its instructions and determined to have a sheer strength after 24 hours as thusly applied to a cement fiberboard substrate of 12 psi (which is on the order of 10 times the 1 psi sheer strength, as previously described, of a repositionable adhesive). It should be understood that adhesives will normally increase in sheer strength after a longer time such as one or two months, but clearly would not be expected to decrease in sheer strength.

The membrane is more particularly described as the previously discussed Polycraft paper (specifically identified as 55# polycoated paper) having a coating of about 0.0005 polyethylene film (to which the adhesive was bonded) applied to ⅟₃₂ inch thick paper, and manufactured by Papertec Inc., 141 Lanza Rd., Bldg. 29, Garfield, N.J. 07026.

The installation was the porcelain tile over the membrane over the concrete substrate, assembled as discussed in the present application. The concrete base or substrate was prepared and cured for a minimum of 28 days prior to testing. The surface was swept clean and thoroughly dried prior to applying the underlayment by a TCNA representative. A wood frame was built and placed around the perimeter of the system in order to prevent the tiles from sliding off the test assembly in case of test failure (which did not occur). The spray adhesive was applied as discussed above and allowed to become tacky (approximately 30 minutes). Pieces of the membrane were installed over the adhesive along the outer perimeter edges of the test pad. The rest of the test pad area was covered with smaller cut pieces. A ¼" gap was left between the pieces. The underlayment mat (i.e., the applied membrane) was then rolled with a small hand roller. Necessary cuts were made to the tiles with a wet saw, and the tiles dried prior to installation. All tile and grout installation was performed by a TCNA representative. The mortar, mixed with water per the manufacturer's recommendations (mix ratio of 38:100), was troweled over the underlayment (membrane) with a ¼"×⅜" square-notched trowel. The thin-set mortar was first keyed-in with the flat side of the trowel and then combed with the notched side to form parallel ridges. The tiles were back-buttered with a skim coat to ensure proper coverage. The tiles were set in the thin-set mortar by pressing down and sliding the tiles in a direction perpendicular to the combed ridges. A beat-in block and rubber mallet were used to reduce lippage between tiles. Once set, the system was allowed to cure for 24 hours before grouting. The grout, mixed with water per the manufacturer's recommendations (mix ratio of 16.6:100), was forced into the 3/16" grout joints with a rubber float. The grout was allowed to set up for approximately 20 minutes before the installation was cleaned with s sponge and water. The grouted installation was subsequently allowed to cure for 39 days.

The installation completed six cycles (wherein weighted rollers representative of foot traffic are applied to the tiled test specimen) with no evidence of damage to the tiles or grout joints. At the completion of cycle seven (hard rubber wheels, three hundred pounds per wheel), there was one cracked grout joint. At the completion of cycle eight (hard wheels, three hundred pounds per wheel), there were two additional cracked grout joints and one chipped tile. All evaluation criteria were based on 8 tiles and 8 grout joints in the wheel path of the Robinson-type floor tester.

In accordance with the Performance-Level Requirement Guide and Selection Table of the 2014 *TCNA Handbook for Ceramic, Glass, and Stone Tile Installation* (page 40), the test pad results were classified as "LIGHT COMMERCIAL," which means that the 12 psi shear strength of the releasable and not repositionable adhesive was considered to be adequate for a "LIGHT COMMERCIAL" ceramic tile floor installation.

All of the tiles were removed from the test pad after testing. There were 8 full pieces and 12 half pieces of tile original installed on the test pad. The tiles were removed using a crow bar and rubber mallet. All pieces except one came off the test pad in full pieces. The only tile that did not come off as a full piece was the tile that cracked during testing. The adhesive and underlayer (membrane) that remained on the concrete surface was removed using a paint scraper. The removal process took approximately 18 minutes to perform. The LIGHT COMMERCIAL-laid tiles and membrane were thus successfully removed quickly and easily for replacement with new tiles (as well as a new membrane with new adhesive).

Test 2: TCNA-304-14 of Jul. 28 to 30, 2014

The test method used was ANSI A118.12 titled "Specification for Crack Isolation Membranes for Thin-Set Ceramic Tile and Dimension Stone Installation" Section 5.4 "System Crack Resistance," and all specimens were set up and treated according to the method specified therein. All materials are the same as used for the above Test 1 and similarly applied.

The release spray adhesive (Spray Lock's 3500 adhesive, which was discussed above in Test 1) was applied to the faces of two 10×8×2-inch concrete blocks (representing the substrate), butted and strapped together to form a 20×8×2-inch unit, per Applicant's instructions. The spray adhesive was allowed to become tacky (approximately 30 minutes) before applying the membrane per the manufacturer's directions (with the polyethylene coating facing downwardly to contact the adhesive). A specific pattern of of 4×8×½-inch quarry tiles (detailed by the method) was bonded to the membrane with the latex modified thin-set mortar using a ¼"×⅜" square-notch trowel. The system was allowed to cure for 24 hours before grouting with the grout. The blocks were cured for an additional 28 days.

3 specimens were tested, wherein a gap is produced in the substrate (the strapped together concrete blocks) represent a crack, and the gap is gradually increased while observing for tile failure. The test specification labels as "standard performance" if tile failure occurs after 1/16" specimen gap opening, illustrated at 510 in FIG. 23, but before ⅛" gap opening 510. The test specification labels as "high performance" if tile failure does not occur by ⅛" specimen gap opening. All 3 specimens were tested to a gap opening of 9/64", and there was no tile failure observed in any of the 3 specimens at the gap opening of 9/64". Thus, the testing showed adequate crack isolation/resistance even for cracks in the substrate greater than ⅛ inch, i.e., greater than required even for a high performance rating.

Without being bound by theory here or elsewhere in this specification, Applicant believes that the crack isolation results from the shear and pivot strengths of the adhesive preventing sideways and pivoting movements of the membrane (which would cause cracks in the ceramic tiles or grouting) and the resulting harmless stretching of the membrane (specifically the polyethylene coating in this instance) as the crack increases in size.

Test 3: TCNA-527-14 of Oct. 20 to 21, 2014

The test method used was ASTM C627 titled "A Standard Test Method for Evaluating Ceramic Floor Tile Installation Systems Using the Robinson-Type Floor Tester" (the same test method as conducted for the above Test 1). TCNA supplied a concrete base (substrate) with a smooth finish with a nominal size of 48"×48'×2" (1219 mm×1219 mm×51 mm), 12"×12" Crossville porcelain tile (product code A850), a Laticrete 254 platinum latex-modified thin-set mortar (Laticrete product codes 809889-013 and 254-0050-21) and a Laticrete 1500 sanded grout (Laticrete product codes 1545-0025-2 and 848095-001). Applicant supplied the tile release spray adhesive and the tile release membrane. The adhesive is the previously described other formulated Spray-Lock water-based acrylic spray adhesive having a shear strength, as tested by Spray Lock similarly as the Spray Lock 3500 adhesive was tested, of 22 psi after 24 hours and applied in clumps to cover about 20% of the sheet or membrane surface per Spray Lock's instructions for use, which was similarly applied as the 3500 adhesive was applied in Test 1. The membrane is the same type as the membrane used in Test 1.

The installation was the porcelain tile over the membrane over the concrete substrate, assembled as discussed in the present application. The concrete base or substrate was prepared and cured for a minimum of 28 days prior to testing. The surface was swept clean and thoroughly dried prior to applying the underlayment by a TCNA representative. The spray adhesive was applied as discussed above and allowed to become tacky (approximately 30 minutes). 20"×20" pieces of the membrane were placed in the adhesive around the perimeter edges of the system, then the inner area filled in with cut pieces. Special care was taken to ensure that there was a ¼" gap between the pieces of membrane. The underlayment mat (i.e., the applied membrane) was then rolled with a small hand roller to eliminate voids and to secure the bond. Full tiles were installed in the wheel path of the tester. The tiles for the perimeter were cut on a wet saw and dried prior to installation. All tile and grout installation was performed by a TCNA representative. The mortar, mixed with water per the manufacturer's recommendations (mix ratio of 22.9:100), was troweled over the underlayment (membrane) with a ¼"×⅜" square-notched trowel. The thin-set mortar was first keyed-in with the flat side of the trowel and then combed with the notched side to form parallel ridges. The tiles were back-buttered with a skim coat to ensure proper coverage. The tiles were set in the thin-set mortar by pressing down and sliding the tiles in a direction perpendicular to the combed ridges. A beat-in block and rubber mallet were used to reduce lippage between tiles. Once set, the system was allowed to cure for 24 hours before grouting. The grout, mixed with water per the manufacturer's recommendations (mix ratio of 16.6:100), was forced into the $3/16$" grout joints with a rubber float. Excess grout was removed with the edge of the float. The grout was allowed to set up for approximately 20 minutes before the installation was cleaned with s sponge and water. The grouted installation was subsequently allowed to cure for 28 days.

The installation completed fourteen cycles (wherein weighted rollers representative of foot traffic are applied to the tiled test specimen) with no evidence of damage to the tiles or grout joints. All evaluation criteria were based on 8 tiles and 8 grout joints in the wheel path of the Robinson-type floor tester. In accordance with the Performance-Level Requirement Guide and Selection Table of the 2014 *TCNA Handbook for Ceramic, Glass, and Stone Tile Installation* (page 40), the test pad results were classified as "EXTRA HEAVY," which means that the 22 psi shear strength of the releasable and not repositionable adhesive is considered to be adequate for a "EXTRA HEAVY" ceramic tile floor installation.

All of the tiles were removed from the test pad after testing. There were 8 full pieces and 12 half pieces of tile original installed on the test pad. All tiles and tile pieces were removed without cracking. The full system including the membrane was removed as one full unit. Some adhesive residue remained on the concrete surface. The removal process took less than 1 minute to perform. It took an additional 5 minutes to scrap the visible adhesive from the concrete surface but the substrate (concrete surface) still felt tacky after removal. The EXTRA HEAVY-laid tiles and membrane were thus successfully removed quickly and easily for replacement with new tiles (as well as a new membrane and new application of adhesive).

Test 4: TCNA-159-07 of May 9, 2007

The test method used was ASTM C627 titled "A Standard Test Method for Evaluating Ceramic Floor Tile Installation Systems Using the Robinson-Type Floor Tester" (the same test method as conducted for the above Tests 1 and 3). A tile installation over a concrete base (substrate) was prepared using the following materials: (1) 42"×42"×2" concrete base (substrate) with a smooth finish; (2) 0.080 gauge vinyl composition tile (VCT) referred to by Applicant as Lay-It-Loose and similarly as described with reference to FIGS. 1A and 1B of the drawings; (3) TEC latex modified thin-set mortar; (4) 12"×12" Crossville porcelain tiles (with $3/16$" grout joints); and a custom Polyblend sanded grout.

Latex-modified thin-set mortar, mixed with water per the manufacturer's instructions was troweled over the membrane assembly with a $1/4$"×$3/8$" square-notched trowel. The thin-set mortar was first keyed-in with the flat side of the trowel and then combed with the notched side to form parallel ridges. The ceramic tiles were then set in the thin-set by pressing down and sliding the tiles in a direction perpendicular to the combed ridges. A beat-in block and rubber mallet were used to reduce lippage between tiles. After the tiles were installed, the thin-set was allowed to cure for 24 hours prior to grouting.

Sanded grout, mixed with water per the manufacturer's instructions, was forced into the $3/16$" grout joints with a rubber float. The grout was allowed to set up for approximately 20 minutes and the installation was then cleaned with s sponge and water. The completed installation was allowed to cure for 28 days. At the end of the cure period, the installation was subjected to load cycling as defined in ASTM C-627.

All evaluation criteria were based on 8 tiles and 8 joints in the wheel path of the Robinson-type floor tester. The installation completed two cycles with no evidence of damage to the tiles. At the completion of cycle three (soft rubber wheels, three hundred pounds per wheel), five grout joints were cracked. At this point, the damage constituted FAILURE of the installation according to the evaluation criteria of ASTM C-627.

Although Applicant had some success with this loose lay type of installation for light foot traffic in his showroom, this FAILURE is believed to be due to the lack of any adhesive between the tile membranes and the concrete base. This membrane laying without an adhesive, which would clearly have a sheer strength less than 1 psi, may be likened to the use of a repositionable adhesive wherein the sheer strength is on the order of 1 psi. This thus shows that the use of a repositionable adhesive is unlikely to provide the durability and crack isolation to be viable for applying the membrane to the substrate in a commercial installation.

In order to provide a complete picture of the TCNA testing leading to the present invention, the following are additional tests which were conducted.

Test 5: TCNA-190-09 of Jun. 23 and 24, 2009

The test method used was ASTM C627 titled "A Standard Test Method for Evaluating Ceramic Floor Tile Installation Systems Using the Robinson-Type Floor Tester". A thin-set installation over a 48"×49½" plywood base (substrate) was prepared using the following materials: (1) APA rated "Exposure 1" tongue and groove plywood subfloor, $19/32$" thick; (2) Laticrete 254 Platinum thin-set mortar; (3) ¼" Dens Shield backer board; (4) As per Applicant's instructions, the platform was divided into 4 quadrants so that 4 different membranes could be tested, respectively as follows: (a) Polykraft paper, referred to as tile-peel off membrane, laid into Apac's #240 permanent adhesive (shiny side up); (b) USG's flooring paper, referred to as tile-lift off membrane, laid into Apac's #240 permanent adhesive (white side up); (c) Polykraft paper, referred to as tile-strip off membrane, laid into Taylor's releasable and not repositionable adhesive (shiny side down); and (d) Polykraft paper, referred to as tile pop off membrane, with AdChem's pre-applied peel-n-stick adhesive bonded to Dens Shield; (5) 12"×12" Crossville porcelain tile ($3/16$" grout joints); and (6) Laticrete 1500 Tripoly sanded grout.

The plywood subfloor was nailed to four 2"×2" joists spaced 16" O.C. to simulate the support provided in the actual installation. Prior to nailing the subfloor, a ¼" bead of construction adhesive was applied to each joist. For maximum stiffness, the face grain was directed perpendicular to the joists. The plywood was nailed to the joists with 2" ring nails set at six-inch centers on the perimeter joists and twelve-inch centers at the intermediate joists. Laticrete 254 Platinum thin-set mortar, mixed with water per the manufacturer's instructions, was troweled over the membrane subfloor with a ¼"× ¼" square-notched trowel. The thin-set mortar was first keyed in with the flat side of the trowel and then combed with the notched side to form parallel ridges. Two (24"×24¾") pieces of ¼" Dens Shield were then applied to the thin-set. The Dens Shield was fastened to the subfloor using 1¼" backer board screws set at eight inch centers, care being taken to not let the fasteners penetrate the framing. The seam was placed along the centerline of the system. Fiberglass mesh tape was applied down the seam and sealed into place with Laticrete 254 thin-set mortar using the flat side of a trowel.

The Dens Shield was marked off into four quadrants and each quadrant contained a different one of the four membranes.

In the first quadrant, Apac's #240 adhesive was troweled over the Dens Shield with a $\frac{1}{16}"\times\frac{1}{16}"$ square-notched trowel. The adhesive was allowed to become tacky before placing the tile-pop off membrane into the adhesive with the shiny side facing up. The membrane was smoothed with the flat side of a trowel to eliminate air underneath.

In the second quadrant, Apac's #240 adhesive was troweled over the Dens Shield with a $\frac{1}{16}"\times\frac{1}{16}"$ square-notched trowel. The adhesive was allowed to become tacky before placing the tile-strip off membrane into the adhesive with the white side down. The membrane was smoothed with the flat side of a trowel to eliminate air underneath.

In the third quadrant, Taylor's 2027 adhesive was applied to the Dens Shield with a short nap roller. The adhesive was allowed to cure for 30 minutes before applying the tile-lift off membrane, shiny side down. The membrane was smoothed with the flat side of a trowel to eliminate air underneath.

In the fourth quadrant, the tile-peel off membrane was rolled out with the sticky side down on the Dens Shield. Air bubbles were carefully removed by puncturing them with a wire brush. Henkel Duro spray adhesive was applied to the top of the tile-peel off membrane and allowed to dry before applying thin-set.

Laticrete 254 Platinum thin-set mortar, mixed with water per manufacturer's instructions, was troweled over each of the four membranes with a $\frac{1}{4}"\times\frac{1}{4}"$ square-notched trowel. The thin-set mortar was first keyed in with the flat side of the trowel and then combed with the notched side to form parallel ridges. The 12"×12" Crossville porcelain tiles were set in the thin-set by pressing down and sliding the tiles in a direction perpendicular to the combed ridges. A beat-in block and rubber mallet were used to reduce lippage (height differential) between tiles. After the tiles were installed, the thin-set was allowed to cure for 24 hours before grouting.

Laticrete 1500 series Tripoly sanded grout, mixed with water per manufacturer's instructions, was forced into the $\frac{3}{16}"$ grout joints with a rubber float. Excess grout was removed with the edge of the float. The grout was allowed to set up for approximately 20 minutes before the installation was cleaned with s sponge and water. The grouted installation was subsequently allowed to cure for 28 days.

At the end of the cure period, the installation was subjected to load cycling as defined in ASTM C-627. The deflection of the plywood subfloor was measured in the wheel path, midway between the 16" O.C. joists.

All evaluation criteria were based on 8 tile and 8 grout joints in the wheel path of the Robinson-type floor tester. The installation completed seven cycles with no evidence of damage to the tile or grout joints. At the completion of cycle eight (hard rubber wheels, three hundred pounds per wheel), one grout joint was cracked and three tiles were broken. The failures occurred in the tile-peel off and tile-lift off portions of the test. The deflection of the plywood subfloor during this cycle was approximately 0.017" At this point, the damage constituted FAILURE of the installation according to the evaluation criteria of ASTM C-627. The maximum deflection during cycling was 0.021".

In accordance with the Floor Tiling Installation Guide of the 2009 *TCA Handbook for Ceramic Tile Installation* handbook, page 15, the installation was classified as "LIGHT" for "light commercial use in office space, reception areas, kitchens, and bathrooms."

Upon completion of the test, the tiles were pulled up to inspect damage underneath per the Applicant's request. Each section showed little or no damage to the Dens Shield tile backer board.

Because the test was conducted on backer board, the best results to be expected on backer board due to its deflection characteristics is the above classification that was received.

Test 6: TCNA-364-09 of Oct. 27 and 28, 2009

The test method used was ANSI A118.12 titled "Specification for Crack Isolation Membranes for Thin-Set Ceramic Tile and Dimension Stone Installation" Section 5.4 "System Crack Resistance."

Tile was bonded with TCNA standard performance ANSI A118.4/A118.11 thin-set mortar. A tile strip-off membrane, USG flooring paper (see test 5) was applied to the faces of two 10×8×2-inch concrete blocks butted and strapped together to form a 20×8×2-inch unit, with Apac #240 permanent adhesive. A specific pattern of 4×8×½-inch quarry tiles (detailed by the method) was bonded to the membrane with the mortar troweled with a $\frac{1}{4}"\times\frac{1}{4}"$ square notch trowel. The system was allowed to cure for 24 hours prior to grouting with Laticrete 1500 series mixed with water. The blocks were cured for an additional 28 days.

There were 3 specimens tested, wherein a gap is produced in the substrate (the strapped together concrete blocks) represent a crack, and the gap is gradually increased while observing for tile failure. For each of the specimens, at a crack width of 0.048 inch, there were three cracked grout joints. There was no other damage up to a crack width of 0.128 inch.

Figure 23:
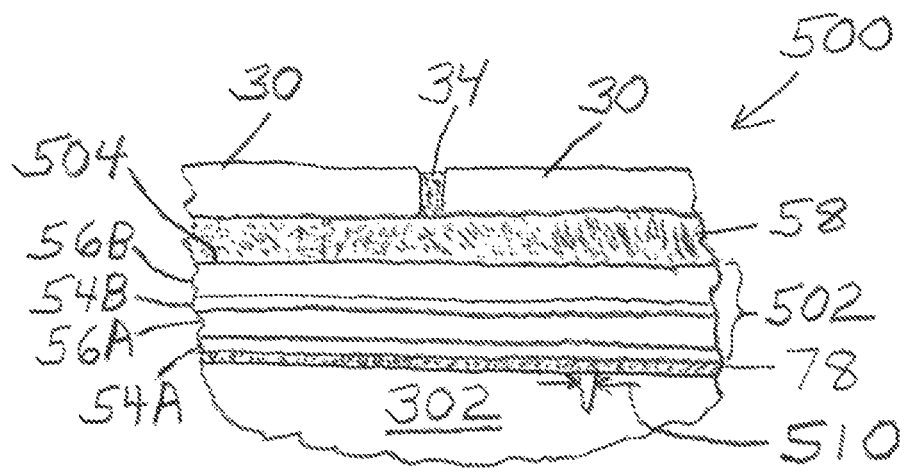
FIGS. 23 to 26 are illustrations of partial edge views of additional alternative embodiments of flooring, and which also serve as illustrations of partial edge views of additional alternative embodiments each of a portion of one of a plurality of articles applied abutting one to another to a substrate thereby also providing flooring, all of which embody the present invention.

The test specification labels as "standard performance" if tile failure occurs after $\frac{1}{16}"$ specimen gap opening, illustrated at 510 in FIG. 23, but before $\frac{1}{8}"$ gap opening 510. The test specification labels as "high performance" if tile failure does not occur by $\frac{1}{8}"$ specimen gap opening. In accordance with ANSI A118.12 system crack resistance test, the material was classified as "HIGH PERFORMANCE."

A high performance rating is not unexpected due to the adhesive being a permanent adhesive, and no tiles ended up being cracked.

Test 7: TCNA-403-09 of Nov. 20 to 23, 2009

The test method used was ASTM C627 titled "A Standard Test Method for Evaluating Ceramic Floor Tile Installation Systems Using the Robinson-Type Floor Tester". A thin-set installation over a 42"×42"×2" concrete base (substrate) with a smooth finish was prepared using the following additional materials: (1) Laticrete 254 Platinum thin-set mortar; (2) Apac's #240 adhesive and Taylor's 2027 adhesive; (3) As per Applicant's instructions, the platform was divided into 4 quadrants so that 4 different membranes could be tested, respectively as follows: (a) first quadrant—the dull side of Polykraft paper, referred to as tile pop off membrane, was set into Apac's 240 permanent adhesive; (b) second quadrant—USG's flooring paper, referred to as tile-strip off membrane, laid into Apac's #240 permanent adhesive; (c) third quadrant—the shiny side of Polykraft paper, referred to as tile-lift off membrane, laid into Taylor's 2027 releasable and not repositionable adhesive; and (d) fourth quadrant—peel-n-stick aluminum foil membrane, referred to as Silvrstrip, applied to the concrete base; (4) 12"×12" Crossville porcelain tile ($\frac{3}{16}"$ grout joint); and (5) Laticrete 1500 Tripoly sanded grout.

The concrete subfloor was marked off into the 4 quadrants each containing the membrane indicated above.

In the first quadrant, Apac's #240 adhesive was troweled over the concrete subfloor (substrate) with a $\frac{1}{16}"\times\frac{1}{16}"$ square-notched trowel. The adhesive was allowed to become tacky before placing the tile-pop off membrane into the adhesive with the shiny side facing up. The membrane was smoothed with the flat side of a trowel to eliminate air underneath.

In the second quadrant, Apac's #240 adhesive was troweled over the concrete subfloor (substrate) with a 1/16"×1/16" square-notched trowel. The adhesive was allowed to become tacky before placing the tile-strip off membrane into the adhesive with the white side down. The membrane was smoothed with the flat side of a trowel to eliminate air underneath.

In the third quadrant, Taylor's 2027 adhesive was applied to the concrete subfloor (substrate) with a short nap roller. The adhesive was allowed to cure for approximately thirty minutes before applying the tile-lift off membrane, shiny side down. The membrane was smoothed with the flat side of a trowel to eliminate air underneath.

In the fourth quadrant, the Silvrstrip membrane was rolled out onto the concrete subfloor (substrate) with the sticky side down. Care was taken not to tear or reposition the membrane. Before spreading thin-set, a wire brush was used to slightly scratch the membrane surface.

Laticrete 254 Platinum thin-set mortar, mixed with water per manufacturer's instructions, was troweled over the four membranes with a 1/4"×1/4" square-notched trowel. The thin-set mortar was first keyed in with the flat side of the trowel and then combed with the notched side to form parallel ridges. The 12"×12" Crossville porcelain tiles were set in the thin-set by pressing down and sliding the tiles in a direction perpendicular to the combed ridges. A beat-in block and rubber mallet were used to reduce lippage between tiles. After the tiles were installed, the thin-set was allowed to cure for 24 hours before grouting.

Laticrete 1500 series Tripoly sanded grout, mixed with water per manufacturer's instructions, was forced into the 3/16" grout joints with a rubber float. Excess grout was removed with the edge of the float. The grout was allowed to set up for approximately 20 minutes before the installation was cleaned with s sponge and water. The grouted installation was subsequently allowed to cure for 28 days.

At the end of the cure period, the installation was subjected to load cycling as defined in ASTM C-627.

All evaluation criteria were based on 8 tile and 8 grout joints in the wheel path of the Robinson-type floor tester. The installation completed six cycles with no evidence of damage to the tile or grout joints. At the completion of cycle seven (hard rubber wheels, three hundred pounds per wheel), one tile was broken. At the completion of cycle thirteen (steel wheels, two hundred fifty pounds per wheel), there was one additional tile broken and one cracked grout joint. The failures occurred in the Silvrstrip and tile-lift off portions of the test. At this point, the damage constituted FAILURE of the installation according to the evaluation criteria of ASTM C-627.

In accordance with the Floor Tiling Installation Guide of the 2009 *TCA Handbook for Ceramic Tile Installation Handbook*, the installation was classified as "HEAVY" for "shopping malls, stores, commercial kitchens, work areas, laboratories, auto showrooms and service areas, shipping/receiving, and exterior decks."

Upon completion of the test, the tiles were removed to inspect damage underneath per the Applicant's request. Each section showed little or no damage to the subfloor.

It should be especially noted that the TCNA especially stated that special care was taken, with respect to the fourth quadrant, not to tear or reposition the membrane.

Test 8: TCNA-084-11 of Apr. 25, 2011

The test method used was ASTM C627 titled "A Standard Test Method for Evaluating Ceramic Floor Tile Installation Systems Using the Robinson-Type Floor Tester". A thin-set installation over a 48"×48"×2" concrete base (substrate) with a smooth finish was prepared using the following additional materials: (1) Mohawk's Nu Spraylok DK spray adhesive, which was made by Spray Lock for Mohawk and which is believed to be no longer available, and which was applied so that the adhesive covered about 10% of the test pad, which was about half of the manufacturer's instructions for use; (2) Applicant's Nue Coat 62 polyvinylchloride membrane having a thickness of 0.062" applied to a first section, and Applicant's Nue Coat 37 polyvinylchloride membrane having a thickness of 0.037" applied to a second section, both membranes supplied by Win Plastic Extrusions, LLC, 3333 Win St., Cuyahoga Falls, Ohio 44223; (3) Mapei Kerabond Premium Grade Dry Set mortar and Mapei Keralastic Premium Grade Flexible mortar latex additive: (4) 12"×12" Crossville porcelain tile (3/16" grout joint); and (5) Quartz Lock 2 urethane grout.

The concrete subfloor or substrate was marked off into two equal sections (24"×24"). Both sections were lightly sprayed (to cover only about 10% of the surface as contrasted with the manufacturer's instructions to cover about 20% of the surface) with the adhesive. The adhesive was allowed to dry until there was no transfer when lightly touched. Nue Coat 37 was placed in the first section with its pebble face up and Nue Coat 62 was placed in the second section with its pebble face down. Both membranes were abutted and smoothed with a small nap roller to eliminate air underneath. Duck brand tape was then applied down the abutted seam of the centerline of the system.

The mortar, mixed with the latex additive per the manufacturer's instructions, was troweled over the membranes with a 1/4"×3/8" square-notched trowel. The thin-set mortar was keyed-in with the flat side of the trowel to form a scratch coat. This was allowed to cure for two hours. The mortar, mixed with the latex additive per the manufacturer's instructions, was troweled over the scratch coat with a 1/4"×3/8" square-notched trowel. The thin-set mortar was first keyed-in with the flat side of the trowel and then combed with the notched side to form parallel ridges. The tiles were set in the thin-set by pressing down and sliding the tiles in a direction perpendicular to the combed ridges. A beat-in block and rubber mallet were used to reduce lippage between tiles. After the tiles were installed, the thin-set was allowed to cure for 24 hours before grouting.

The urethane premixed grout was forced into the 3/16" grout joints with a rubber float. Excess grout was removed with the edge of the float. The grout was allowed to set up for approximately 20 minutes before the installation was cleaned with s sponge and water. The grouted installation was subsequently allowed to cure for 28 days.

At the end of the cure period, the installation was subjected to load cycling as defined in ASTM C627. All evaluation criteria were based on 8 tiles and 8 grout joints in the wheel path of the Robinson-type floor tester. The installation completed three cycles with no evidence of damage to the tile or grout joints. At the completion of cycle four (soft rubber wheels, three hundred pounds per wheel) two tiles were broken. The failures occurred in both membrane sections of the test. At this point, the damage constituted failure of the installation according to the evaluation criteria of ASTM C627.

In accordance with the Floor Tiling Installation Guide of the 2011 *TCNA Handbook for Ceramic, Glass, and Stone Tile Installation* (page 37), the installation was classified as "RESIDENTIAL," for "Kitchens, bathrooms, and foyers."

Upon completion of the test, the tiles were removed to inspect damage underneath per the Applicant's request. Each section showed little or no damage to the subfloor (substrate).

Since only a light coating of adhesive equal to about half of the manufacturer's recommendation was used, this may mean that the amount of adhesive may not have had enough strength to achieve to receive a light commercial rating.

Test 9: TCNA-333-11 of Oct. 26 and 27, 2011

The test method used was ASTM C627 titled "A Standard Test Method for Evaluating Ceramic Floor Tile Installation Systems Using the Robinson-Type Floor Tester". A thin-set installation over a 48"×48"×2" concrete base (substrate) with a smooth finish was prepared using the following additional materials: (1) Applicant's Nue Tile Peel n Strip (also called Nue Tile Coat), Nue Tile Quick Lift (also called Nue Tile Strip), and Nue Tile EZ Strip (also called Nue Tile Liner) pre-applied releasable adhesive membranes applied to three sections respectively; (2) Laticrete 254 Platinum thin-set mortar (3) 12"×12" Crossville porcelain tile (3/16" grout joint); and (4) Laticrete 1500 sanded grout.

All 3 of the New Tile products utilized a releasably adhesive double-sided tape (having a thickness on the order of 1/128 inch) with a polyester carrier to which the adhesive was applied on both sides and identified as Adchem 254M, manufactured by Adchem Corporation of 1852 Old Country Rd., Riverhead, N.Y. 11901, and supplied by the previously identified Walco Corp. Applicant's Nue Tile Peel n Strip comprised the previously described Polykraft paper (about 1/64 inch thick 40# paper) adhesively attached to the tape. This membrane was tested by Spray Lock and determined by Spray Lock to have adhesive shear strength of 12.4 psi after 24 hours from application time and 11.2 psi after 7 days from application time (as compared, as herein elsewhere discussed, to the shear strength of a repositionable adhesive (using different membrane materials) of less than 1 psi. Applicant's Nue Tile Quick Lift comprised the previously described USG (United States Gypsum Corp.) flooring paper (about 1/32 inch thick) adhesively attached to the tape. Applicant's Nue Tile EZ Strip was aluminum foil (less than 1/64 inch thickness) supplied by the previously identified Walco Corp. and adhesively attached to the tape. Walco Corp. attached the tape to each of the papers/foil.

The concrete subfloor or substrate was marked off into three sections (24"×24"). The Nue Tile Peel n Strip was cut down to a 24"×48" piece and placed on the concrete and smoothed with the flat side of a trowel to eliminate voids and wrinkles in the membrane. Each of the other membranes was cut down to a 24"×24" piece. The Nue Tile Quick Lift was slightly overlapped by the Nue Tile Peel n Strip and, once overlapped, was smoothed with the flat side of a trowel to eliminate voids and wrinkles in the membrane. The Nue Tile EZ Strip was cut into several pieces and slightly overlapped, with each piece being smoothed with the flat side of a trowel to eliminate voids and wrinkles in the membrane.

The mortar, mixed with water per the manufacturer's instructions, was troweled over the membranes with a 1/4"×3/8" square-notched trowel. The thin-set mortar was keyed-in with the flat side of the trowel to form a scratch coat. This was allowed to cure for two hours. The mortar, mixed with water per the manufacturer's instructions, was troweled over the scratch coat with a 1/4"×3/8" square-notched trowel. The thin-set mortar was keyed-in with the flat side of the trowel and then combed with the notched side to form parallel ridges. The tiles were set in the thin-set by pressing down and sliding the tiles in a direction perpendicular to the combed ridges. A beat-in block and rubber mallet were used to reduce lippage between tiles. After the tiles were installed, the thin-set was allowed to cure for 24 hours before grouting.

The grout, mixed with water per the manufacturer's instructions, was forced into the 3/16" grout joints with a rubber float. Excess grout was removed with the edge of the float. The grout was allowed to set up for approximately 20 minutes before the installation was cleaned with s sponge and water. The grouted installation was subsequently allowed to cure for 28 days.

At the end of the cure period, the installation was subjected to load cycling as defined in ASTM C627. All evaluation criteria were based on 8 tiles and 8 grout joints in the wheel path of the Robinson-type floor tester. The installation completed all fourteen cycles with no evidence of damage to the tile or grout joints.

In accordance with the Performance Level Requirement Guide and Selection Table of the 2011 *TCNA Handbook for Ceramic, Glass, and Stone Tile Installation* (page 37), the installation was classified as "EXTRA HEAVY," for "extra heavy and high-impact use in food plants, breweries, and kitchens."

Upon completion of the test, the tiles were removed to inspect damage underneath per the Applicant's request. Each section exhibited no damage of damage to the subfloor (substrate).

Test 10: TCNA-604-12 of Nov. 13, 2012

The test method used was ANSI A118.12 titled "Specification for Crack Isolation Membranes for Thin-Set Ceramic Tile and Dimension Stone Installation" Section 5.4 "System Crack Resistance Test."

Applicant's Nue Coat Peel n Stick pre-applied releasable adhesive membrane (same as used in Test 9) was applied to the faces of two 10×8×2-inch concrete blocks butted and strapped together to form a 20×8×2-inch unit. A specific pattern of 4×8×½-inch quary tiles (detailed by the method) was bonded to the membrane with Mapei Keralastic premium-grade dry-set mortar mixed with Mapei Keralastic premium-grade flexible mortar latex additive and troweled with a ¼×⅜-inch U-notch trowel. The system was allowed to cure for 24 hours prior to grouting with Mapei keracolor S grout, mixed with water. The blocks were cured for an additional 28 days.

3 specimens were tested, wherein a gap is produced in the substrate (the strapped together concrete blocks) representing a crack, and the gap is gradually increased while observing for tile failure. The test specification labels as "standard performance" if tile failure occurs after 1/16" specimen gap opening, illustrated at 510 in FIG. 23, but before ⅛" gap opening 510. The test specification labels as "high performance" if tile failure does not occur by ⅛" specimen gap opening. All 3 specimens were tested to a gap opening of 0.128", and there was no cracking of grout or tile failure observed in any of the 3 specimens, except that a cracked grout joint was observed in one specimen at a gap opening of 0.032".

Definition of Crack Isolation

Crack isolation refers to the ability of flooring to withstand the propagation of cracks in the substrate without itself cracking. Since the membrane is held between the mortar and the substrate against movement except in shear and in pivot (which is really a species of shear strength), it is believed that the quality of crack isolation of the releasable and not repositionable adhesive depends on its ability to withstand movements in shear due to crack propagation in the substrate. This ability to withstand such movements is related to its shear strength. Test 2 above shows the achievement of a high performance rating (tile failure not occurring by ⅛" substrate gap opening, i.e., crack width 510) when using an adhesive having a shear strength after 24 hours after application of 12 psi. It is thus clear that the lesser standard performance rating (tile failure not occurring by 1/16" substrate gap opening, i.e., crack width 510) would be obtainable when using an adhesive having a shear strength even less than 12 psi after 24 hours after application. A standard performance rating is considered to be adequate for many applications. Accordingly, a reference herein and in the claims to an adhesive or a tile floor having crack isolation, which is essential to providing satisfactory ceramic tile floors, refers to an adhesive (or a ceramic tile floor laid with such an adhesive) which has a shear strength adequate to withstand without cracking of the ceramic tile or the grouting between the ceramic tile the propagation of a crack in the substrate of a width of 1/16 inch. Preferably, the adhesive and ceramic tile floor laid therewith has high performance crack isolation, i.e., defined, for the purposes of this specification and the claims, as having the ability to withstand the propagation of a crack in the substrate of a width of 1/8 inch. An adhesive (and ceramic tile floor laid therewith) having a shear strength of at least 12 psi after 24 hours after application is defined herein and in the claims as having crack isolation. More preferably, the adhesive (and ceramic tile floor laid therewith) has a shear strength of at least 22 psi after 24 hours after application and is defined herein and in the claims as having high performance crack isolation.

Referring again to FIG. 7, in order to provide a good releasable bond when the releasable and not repositionable adhesive is applied, the coating or layer 54 for the paper 56 in the membrane 42b is preferably a non-porous material and is also desirably a water barrier material to prevent moisture emissions from the substrate (especially if concrete) from detrimentally reaching the paper. In addition to the layer 54 being plastic, such as polyethylene, the layer 54 may be composed of any other suitable non-porous material such as metal, for example, aluminum, and synthetic and natural rubber, which are also considered to be suitable water barrier materials.

Softness of the sheet or membrane to which the adhesive 78 is applied, as disclosed by the above Mao reference, too easily transmits forces due to crack propagation in the substrate to the ceramic tiles and grouting to thereby undesirably cause cracks therein and ruin them. Contrary to such a teaching in Mao, it is thus considered critical to providing adequate crack isolation to provide a sheet or membrane to which the adhesive 78 is applied of sufficient hardness that it will be sufficiently resistant to transmitting such crack propagation forces. It is believed that a membrane thickness of up to 1/32 inch has sufficient hardness due to its lack of substantial bulk to have the necessary hardness no matter what material the membrane is made of. The sheet or membrane to which the adhesive 78 is applied may thus be of any otherwise suitable material such as rubber having a thickness up to about 1/32 inch in order to provide the necessary hardness. For membrane thickness over 1/32 inch, suitable materials for the membrane include metals (such as aluminum), paper, and hard plastics (such as plexiglass and a hard and dense polyvinylchloride). Preferably, the surface of the membrane to which the adhesive is applied will also be non-porous (as well as providing a water barrier) so as to suitably provide the desired bonding and protection of the adhesive.

Referring to FIG. 23, there is shown generally at 500 a ceramic tile floor in accordance with an alternative embodiment of the present invention, including a membrane, illustrated generally at 502, applied to a substrate 302 with a releasable and not repositionable adhesive 78 and with ceramic tiles 30 bonded to the membrane 502 with a latex modified or other suitable mortar 58, such as any suitable mortar described in this specification.

The membrane 502 includes, in order from the substrate 302 to the mortar 58, (1) a lower layer 54A of plastic or other non-porous material such as metal or rubber to provide a good releasable bond to the substrate 302 as well as to provide a moisture barrier to prevent moisture emissions from the substrate (especially if concrete) from detrimentally reaching the paper, (2) a lower layer 56A of paper (or which may be other suitable material as described hereinafter), (3) a second layer 54B (described hereinafter), and (4) a second layer of paper (or which may be other suitable material as described hereinafter). The thickness of each non-porous layer 54A and 54B, which does not contribute substantially to the overall thickness of the membrane 502) may, for example, be about 0.0005 mil, and the thickness of each paper layer 56A and 56B may, for example, be about 1/32 inch.

While a non-porous layer may be provided next to the mortar 58, as will be discussed with reference to FIG. 24, the paper layer 56B is preferably provided next to the mortar 58 in order to provide better bonding to the mortar, which allows the mortar 58 to be the less expensive latex-modified thin-set mortar.

While not completely understood, it is believed that water from the mortar 58 may undesirably tend to seep into the paper 56 like a sponge causing swelling and resulting in ripples in the layer 54A releasing it in spots from the substrate 302 thereby causing an edge or edges of an overlying tile 30 to rise slightly and thus cause the laid tiles not to lay as flat as desired, a condition known as lippage. As the paper thickness increases, this seems to become more of a problem. In order to protect the layer 56A of paper from this undesired water seepage from the mortar 58, in accordance with the present invention, the layer 54B is composed of polyethylene (the same material of which layer 54A is composed) or other suitable water barrier material.

In order to provide additional protection to the paper 56, the upper surface (which faces the mortar 58) of the paper layer 56B may be sprayed with a suitable water-resistant spray, illustrated at 504, such as, for example, general purpose gloss work & turn spray coating #Q1007B manufactured by Prisco, 1625 Boulevard Ave., Pennsauken, N.J. 08110.

While the membrane 502 may be manufactured in any suitable manner, one way in which it may be produced is by bonding or laminating together two sheets of the Polykraft paper discussed with reference to FIG. 7. The Polykraft paper comes in two types, i.e., one wherein the polyethylene coating has a matt finish and one wherein the polyethylene coating has a white or clear high gloss finish. The layer 54A preferably has the high gloss finish which appears to protect better against the hydrostatic moisture pressure from the substrate 302, especially a concrete substrate. The layer 54B preferably has a matt finish, which may bond to the paper, i.e., paper layer 56A, better and which is less expensive, i.e., Polykraft paper with the matt finish to the polyethylene is less expensive. Polykraft paper is manufactured by the aforesaid PaperTec Inc. of Garfield, N.J. The Polykraft paper may be made from 42# Kraft liner board paper, in order to be better conforming to contours that may exist in the substrate, but may also be made from another suitable size paper such as 50# or 55#, these Kraft papers manufactured by griff Paper & Film of 275 Lower Morrisville Rd., Fallsington, Pa. 19054.

While the membrane 502 is shown to have two paper layers 56, it should be understood that the membrane 502 may have more than two paper layers 56. Likewise, while the membrane 502 is shown to have two non-porous/water barrier layers 54, it should be understood that the membrane 502 may have more than two non-porous/water barrier layers 54. While the layers 56A and 56B are shown to be of the same material, i.e., paper, with the same thickness, it should be understood that they may be composed of suitable different materials and with suitable different thicknesses. Likewise, while the layers 54A and 54B are shown to be of the same material, i.e., polyethylene, with the same thickness, it should be understood that they may be composed of suitable different materials and with suitable different thicknesses.

Figure 24:
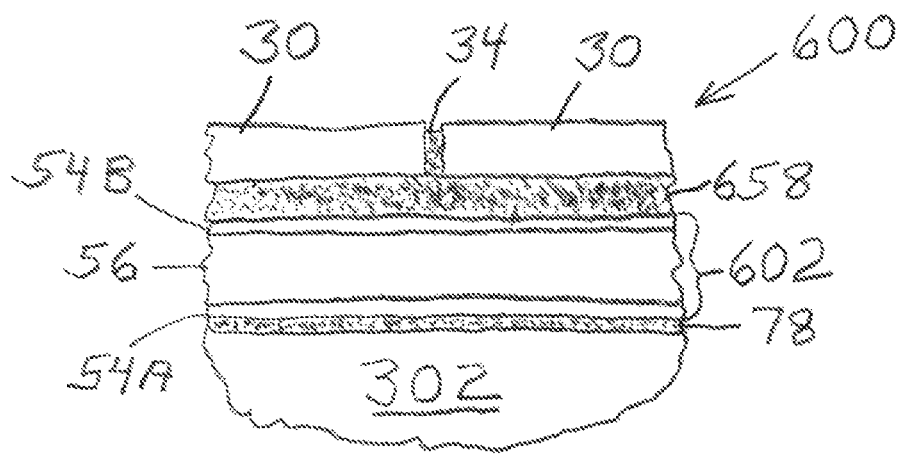

Referring to FIG. 24, there is shown generally at 600 a ceramic tile floor in accordance with another alternative embodiment of the present invention, including a membrane, illustrated generally at 602, applied to a substrate 302 with a releasable and not repositionable adhesive 78 and with ceramic tiles 30 bonded to the membrane 602 with a hereinafter described thin-set mortar 658.

In this embodiment, the membrane 602 has a single thick paper layer 56 having a thickness equal to the combined thickness of the two paper layers of FIG. 23. The paper layer 56 is sandwiched between lower and upper non-porous/water barrier layers 54A and 54B respectively, the layer 54A serving the same function as discussed above for floor 500. The upper water barrier layer 54B is provided in this embodiment next to the mortar 58 in order to provide enhanced protection from water seepage into the paper 56 from the mortar 58.

It has been found that the inexpensive latex-modified thin-set mortar (as used in the flooring 500) may not bond as well as desired to the non-porous polyethylene or other water barrier layer 54B. A thin-set mortar to which a liquid latex additive is applied during mixing has been found to provide improved bonding to the polyethylene layer 54B. Therefore, in accordance with the present invention, the mortar 658 is preferably a thin-set mortar mixed with liquid latex.

While the membrane 602 may be manufactured in any suitable manner, one way in which it may be produced is by bonding or laminating together two sheets of the Polykraft paper wherein the layer 54A preferably has the high gloss finish which appears to protect better against the hydrostatic moisture pressure from the substrate 302, especially a concrete substrate, and wherein the layer 54B preferably has a matt finish for better bonding.

Thin-set mortar (also referred to as thinset cement, dryset mortar, drybond mortar, or just thinset) is an adhesive mortar made of cement, fine sand, and a water retaining agent such as an alkyl derivative of cellulose. Such a mortar, identified as Flextile 51 premium floor and wall thin-set mortar is provided by Flextile Ltd. of Toronto, Canada. A suitable liquid latex additive therefor is also provided by Flextile, Ltd. and identified as Flextile 44 high solids latex thin-set mortar additive. A suitable latex modified thin-set mortar is also provided by Flextile, Ltd. and identified as Flextile Versatile 52 premium-grade polymer-modified mortar (the polymer being latex).

Sound deadening has taken on increased importance in the tiling of floors, walls, and ceilings. While a paper 56 thickness of 1/32 inch may be considered as offering some measure of sound deadening, it is not considered sufficient to meet the typical demands of customers. Therefore, in order to provide the desired enhanced sound-deadening, the thickness or combined thickness of the paper 56 is preferably at least 1/16 inch. Other suitable sound-deadening materials which are also considered suitable for use in the membrane 502 include natural and synthetic rubber and vinyl and polyvinylchloride.

A customer may require sound-deadening in some areas being tiled while requiring less expensive tiling in other areas. When using a membrane thickness in one area, which is adjacent an area where a membrane thickness as much as 1/16 inch less is being used, the thin-set mortar 58 or 658 thickness can be increased as much as 1/16 inch to make up the difference so that the flooring height is even.

Figure 25:
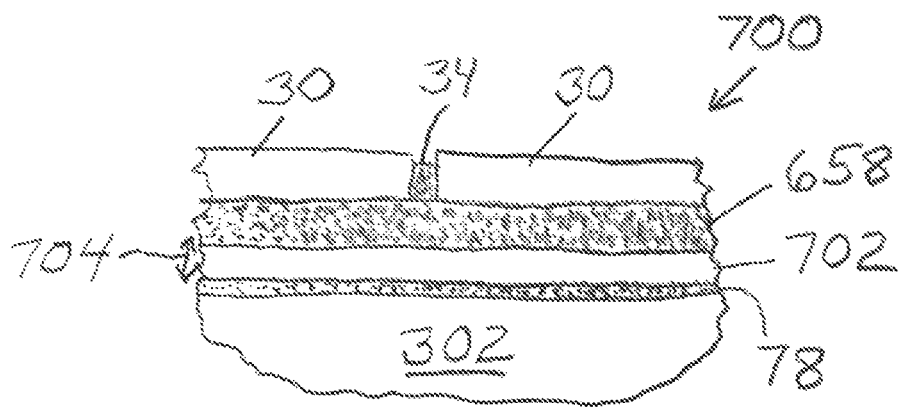

Referring to FIG. 25, there is shown generally at 700 a ceramic tile floor in accordance with another alternative embodiment of the present invention, including a membrane, illustrated at 702, applied to a substrate 302 with a releasable and not repositionable adhesive 78 and with ceramic tiles 30 bonded to the membrane 702 with the thin-set mortar with liquid latex additive mixed therewith, illustrated at 658.

In order to provide sufficient hardness (unlike the softness of membranes disclosed in the aforesaid Mao published application) to provide the desired crack isolation, the membrane 702 should be sufficiently thin to provide the needed hardness or be composed of a material which provides the needed hardness. The membrane should also be non-porous so as to make a good releasable bond with the releasable and not repositionable adhesive 78. A preferred thickness, illustrated at 704, for the membrane 702 in order to achieve the needed hardness is up to 1/32 inch. Suitable non-porous materials providing the necessary hardness are aluminum and other metals and hard plastics. Suitable non-porous materials providing the necessary hardness also include rubber (natural and synthetic) and soft plastics having a thickness 704 up to 1/32 inch.

In order to also provide good sound-deadening while being non-porous to provide a releasable bond with the releasable and not repositionable adhesive 78 and while being sufficiently thin or otherwise sufficiently hard to provide crack isolation, the membrane 702 is preferably a non-porous membrane composed of iron oxide filled vinyl (believed to be two layers of vinyl sandwiching iron oxide compound). A suitable such membrane 702 is one identified as Duracote 5009 iron oxide filled vinyl membrane, provided by Duracoat Advanced Materials, 350 N. Diamond St., Ravenna, Ohio 44266, which has a thickness of less than 1/32 inch and providing the needed hardness for crack isolation). Due to its flimsy nature, it is best applied in rolls. Preferably, the shiny side thereof, being more non-porous, is the side which is adhered to the substrate.

Figure 26:
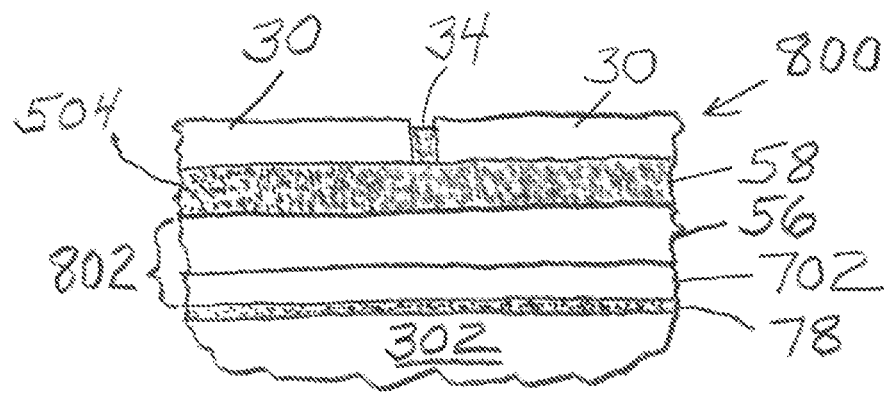

Referring to FIG. 26, there is shown generally at 800 a ceramic tile floor in accordance with another alternative embodiment of the present invention, including a membrane, illustrated at 802, applied to a substrate 302 with a releasable and not repositionable adhesive 78 and with ceramic tiles 30 bonded to the membrane 702 with the latex-modified thin-set mortar 58.

The membrane 802 comprises two layers one of which is the above-described Duracote layer 702 bonded or laminated to Kraft paper 56 or other suitable material, for example, 42# paper, the Kraft paper having a thickness of, for example, about 1/32 to 1/16 inch. The water-resistant spray 504 may be applied to the upper surface of the membrane 802.

Referring again to FIGS. 23 and 24, any or all of the layers 54 may, if desired, be the above-described Duracote layer 702.

Either of the ceramic tile floors 500, 600, 700, and 800 may be laid similarly as hereinbefore discussed for other floors wherein the membrane is adhesively applied to the substrate, the spray 504 applied for the floors 500 and 800, the mortar applied to the membrane, and the ceramic tiles 30 laid in the mortar, followed by the addition of the grout 34. It should be understood that, unless otherwise specified herein or in the claims, the substrate 302 may be a wall or ceiling substrate as well as a floor substrate. Alternatively, similarly as previously discussed for other flooring, the floors 500, 600, 700, and 800 may be laid by bonding the membranes of pre-manufactured articles to the substrate 302, wherein each pre-manufactured article comprises a portion of membrane to which the releasable and not repositionable adhesive 78 has been applied, mortar bonded thereto, and at least one ceramic tile laid in and bonded to the mortar. Thus, while each of FIGS. 23 to 26 illustrates a portion of a floor, they also may be seen as illustrating a portion of a pre-manufactured article which is releasably bonded to a substrate 302 and with similar pre-manufactured articles applied adjacent to each other and also releasably bonded to the substrate 302. It should also be understood that the substrate 302 may be a backer-board applied to a floor or wall or ceiling substrate.

There you have it—ceramic tile performance (including adequate crack isolation) without permanency, easily and inexpensive.

It should be understood that, while the present invention has been described in detail herein, the invention can be embodied otherwise without departing from the principles thereof, and such other embodiments are meant to come within the scope of the present invention as defined by the appended claims.

What is claimed is:

1. A method of laying ceramic tile onto a substrate comprising the steps of:
   (a) selecting a sheet to have at least one non-porous layer, at least one paper layer, and at least one water barrier layer all of which are bonded or laminated together with the at least one paper layer sandwiched between the non-porous and water barrier layers;
   (b) releasably adhering the at least one non-porous layer of the sheet to the substrate;
   (c) applying a mortar to the sheet; and
   (d) laying at least one ceramic tile in the mortar thereby bonding the at least one ceramic tile to the sheet.

2. A method according to claim 1 wherein the step of applying the mortar comprises applying the mortar to the at least one water barrier layer.

3. A method according to claim 1 wherein the step of applying the mortar comprises applying a thinset mortar having a liquid latex additive to the at least one water barrier layer of the sheet.

4. A method according to claim 1 wherein the step of selecting the sheet comprises selecting the sheet to have at least one other paper layer with the water barrier layer sandwiched between the at least one paper layer and the at least one other paper layer, and the step of applying the mortar comprises applying the mortar to the at least one other paper layer.

5. A method according to claim 1 further comprising selecting the non-porous and water barrier layers to each be composed of plastic, metal, or rubber.

6. A method according to claim 1 wherein the step of releasably adhering comprises using a releasable and not repositionable adhesive to adhere the at least one non-porous layer of the sheet to the substrate.

7. A method of laying ceramic tile onto a substrate comprising the steps of:
   (a) releasably adhering a sheet to the substrate once and only once; and
   (b) bonding at least one ceramic tile to the sheet,
   wherein the step of bonding the ceramic tile to the sheet includes applying a mortar to the sheet and laying the ceramic tile in the mortar,
   and wherein the step of releasably adhering a sheet to the substrate comprises the step of using a releasable and not repositionable adhesive.

8. A method according to claim 7 wherein the sheet is made of paper with at least one water barrier layer bonded or laminated thereto.

9. A method according to claim 7 further comprising the step of selecting the sheet to have, in order from one surface thereof to an opposite surface thereof, at least one non-porous layer, at least one first paper layer, at least one water barrier layer, and at least one second paper layer all of which are bonded or laminated together, wherein the step of releasably adhering the sheet to the substrate comprises the step of releasably adhering the at least one non-porous layer of the sheet to the substrate, and wherein the step of applying the mortar to the sheet comprises the step of applying the mortar to the at least one second paper layer of the sheet.

10. A method according to claim 9 further comprising selecting the non-porous and water barrier layers to each be composed of plastic, metal, or rubber.

11. A method according to claim 7 further comprising the step of selecting the sheet to have, in order from one surface thereof to an opposite surface thereof, at least one non-porous layer, paper, and at least one water barrier layer all of which are bonded or laminated together, wherein the step of releasably adhering the sheet to the substrate comprises the step of releasably adhering the at least one non-porous layer of the sheet to the substrate, and wherein the step of applying the mortar to the sheet comprises the step of applying thinset mortar having a liquid latex additive to the at least one water barrier layer of the sheet.

12. A method according to claim 11 further comprising selecting the non-porous and water barrier layers to each be composed of plastic, metal, or rubber.

13. A method according to claim 7 wherein the sheet is composed of iron oxide filled vinyl.

14. A ceramic tile floor comprising:
   (a) a substrate;
   (b) at least one sheet releasably adhered to the substrate; and
   (c) at least one ceramic tile bonded to the sheet with a mortar.

15. A floor according to claim 14 wherein the floor is characterized by having crack isolation.

16. A floor according to claim 14 comprising a releasable adhesive which has a shear strength of at least 12 psi adhering the sheet to the substrate.

* * * * *